(12) United States Patent
Singh

(10) Patent No.: US 11,797,799 B2
(45) Date of Patent: Oct. 24, 2023

(54) SYSTEMS AND METHODS FOR TRANSFERRING DATA CORRESPONDING TO SCANNABLE CODES

(71) Applicant: Citrix Systems, Inc., Fort Lauderdale, FL (US)

(72) Inventor: Manbinder Pal Singh, Coral Springs, FL (US)

( * ) Notice: Subject to any disclaimer, the term of this patent is extended or adjusted under 35 U.S.C. 154(b) by 0 days.

(21) Appl. No.: 17/500,454

(22) Filed: Oct. 13, 2021

(65) Prior Publication Data
US 2023/0110135 A1   Apr. 13, 2023

(51) Int. Cl.
*G06K 7/14* (2006.01)

(52) U.S. Cl.
CPC .................. *G06K 7/1417* (2013.01)

(58) Field of Classification Search
CPC .. G06K 7/1417; G06K 7/1408; G06K 7/1491; G06K 7/1439; G06K 7/1434
See application file for complete search history.

(56) References Cited

U.S. PATENT DOCUMENTS

2016/0117487 A1\* 4/2016 Amacker .............. G06F 16/955
235/494

\* cited by examiner

*Primary Examiner* — Matthew Mikels

(57) ABSTRACT

Described herein are systems and methods for transferring data corresponding to scannable codes. A first device can transmit, responsive to identifying that a user of the first device copied data, an indication to a service that the first device copied the data. The indication can cause the service to enable a second device to paste the data copied from the first device. The first device can receive a request to copy the data from the first device to paste on the second device of the user. The first device can display, responsive to the request, a scannable code corresponding to the copied data to be scanned by a camera of the second device to enable the user of the second device to paste the copied data.

20 Claims, 12 Drawing Sheets

SYSTEMS AND METHODS FOR TRANSFERRING DATA CORRESPONDING TO SCANNABLE CODES

FIELD OF THE DISCLOSURE

The present application generally relates to secure data transfer. In particular, the present application relates to systems and methods for transferring data corresponding to scannable codes.

BACKGROUND

Devices may exchange data via a network. The data transfer can have varying levels of security depending on the data transfer protocols.

BRIEF SUMMARY

Scannable codes such as quick-response (QR) codes can be used for securely transferring data among devices. For example, QR codes can facilitate secure copy-paste if data among devices. By using the scannable codes, the data does not need to be sent over a network or cloud to copy-paste data among devices. By using scannable codes to transfer data, the systems and methods described herein provide secure and private data transfer via QR codes.

In a sample flow, a first device can generate a copy event. The copy event can correspond to the copying of data. The first device can generate a QR code containing the copied data. A second device can receive a "paste using scannable code" option via a browser, remote workplace application, a virtual application, or a network. Selection of this option can cause the second device to initiate scanning of the scannable code using its camera. By scanning the code, the second device can paste the data. In some embodiments, upon a copy event on the first device, a popup or control can be displayed to show a scannable code icon that can be clicked on to expand the scannable code image. The popup or control can include a note guiding or explaining how the paste using scannable code feature can be implemented. The scannable code can be optimally sized so as not to use up the screen. The scannable code can be displayed on the screen for a predetermined amount of time (e.g., a few seconds) before being removed from the screen. In some embodiments a "generate QR code upon copy" option can cause the device to generate the scannable code without necessarily copying the data to the clipboard. By transferring data corresponding to scannable codes, the systems and methods disclosed herein can enable copying-pasting of data among devices while avoiding excessive and inefficient data transfers across networks or cloud-based services.

Various aspects of the present disclosure are directed to systems and methods for copying data corresponding to a scannable code. A first device can transmit, responsive to identifying that a user of the first device copied data, an indication to a service that the first device copied the data. The indication can cause the service to enable a second device to paste the data copied from the first device. The first device can receive a request to copy the data from the first device to paste on the second device of the user. The first device can display, responsive to the request, a scannable code corresponding to the copied data to be scanned by a camera of the second device to enable the user of the second device to paste the copied data.

In some embodiments, the first device may receive, from the service, an indication that the user of the second device requested copying of the data from the first device to the second device. In some embodiments, the first device may identify, responsive to the user interacting with an actionable item on the first device, the request to copy the data from the first device to the second device.

In some embodiments, the first device may display, responsive to identifying that the user of the first device copied the data, an actionable item to display the scannable code responsive to the user interacting with the actionable item. In some embodiments, the first device may transmit indication that the first device copied the data, responsive to the user interacting with an actionable item to display the scannable code.

In some embodiments, the first device may generate, responsive to receiving the request from the service, the scannable code based at least on the data stored on a local buffer. The scannable code may identify the data and metadata associated with the copying of the data. In some embodiments, the first device may receive, responsive to the service identifying the first device of a plurality of devices on which the user copied responsive data based at least on a time of the indication.

Various aspects of the present disclosure are directed to systems and methods for copying data corresponding to a scannable code. A service can have one or more processors coupled with memory. The service can receive, from a first device, an indication that a user of the first device copied data. The service can enable, responsive to the receipt of the indication, a second device to paste the data copied from the first device. The service can cause, responsive to a request to copy the data from the first device, the first device to display a scannable code corresponding to the copied data to be scanned by a camera of the second device to enable the user of the second device to paste the copied data.

In some embodiments, the service may enable, responsive to the receipt of the indication, a plurality of devices associated with the user to paste the data from the first device. In some embodiments, the service may identify, responsive to the request, the first device from a plurality of devices on which the user copied respective data, based at least on a time of receipt of the indication prior to the request.

In some embodiments, the service may provide, to the second device, a list from which to select at least one of a plurality of devices on which the user copied respective data. In some embodiments, the service may transmit, to the first device, an indication that the user requests copying to cause the first device to display the scannable code, responsive to the request received from the second device.

In some embodiments, the service may cause, responsive to the request via an interaction on the first device with an actionable item, the first device to display the scannable code. In some embodiments, the service may transmit, responsive to the second device scanning of the scannable code, an indication of completion to the first device to terminate displaying of the scannable code.

Various aspects of the present disclosure are directed to systems and methods for pasting data corresponding to a scannable code. A first device may enable, responsive to a service receiving an indication that a user of a second device copied data, pasting of the data from the second device to the first device. The first device may receive a request to copy the data from the second device to paste on the first device of the user. The first device may scan, via a camera of the first device, a scannable code corresponding to the copied data displayed by the second device to enable the user of the first device to paste the copied data.

In some embodiments, the first device may display, responsive to enabling the pasting, an actionable item to initiate copying of the data from the second device to the first device responsive to the user interacting with the actionable item. In some embodiments, the first device may display, responsive to the service receiving the indication, a list from which to select at least one of a plurality of devices on which the user copied respective data.

In some embodiments, the first device may transmit the request to copy to the service to forward the request to copy, to cause the second device to display the scannable code corresponding to the data. In some embodiments, the first device may receive the request further comprises identifying initialization of the camera to scan the scannable code corresponding to the copied data. In some embodiments, the first device may identify the user interaction with an actionable item to initiate copying of the data from the second device to the first device.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1A:
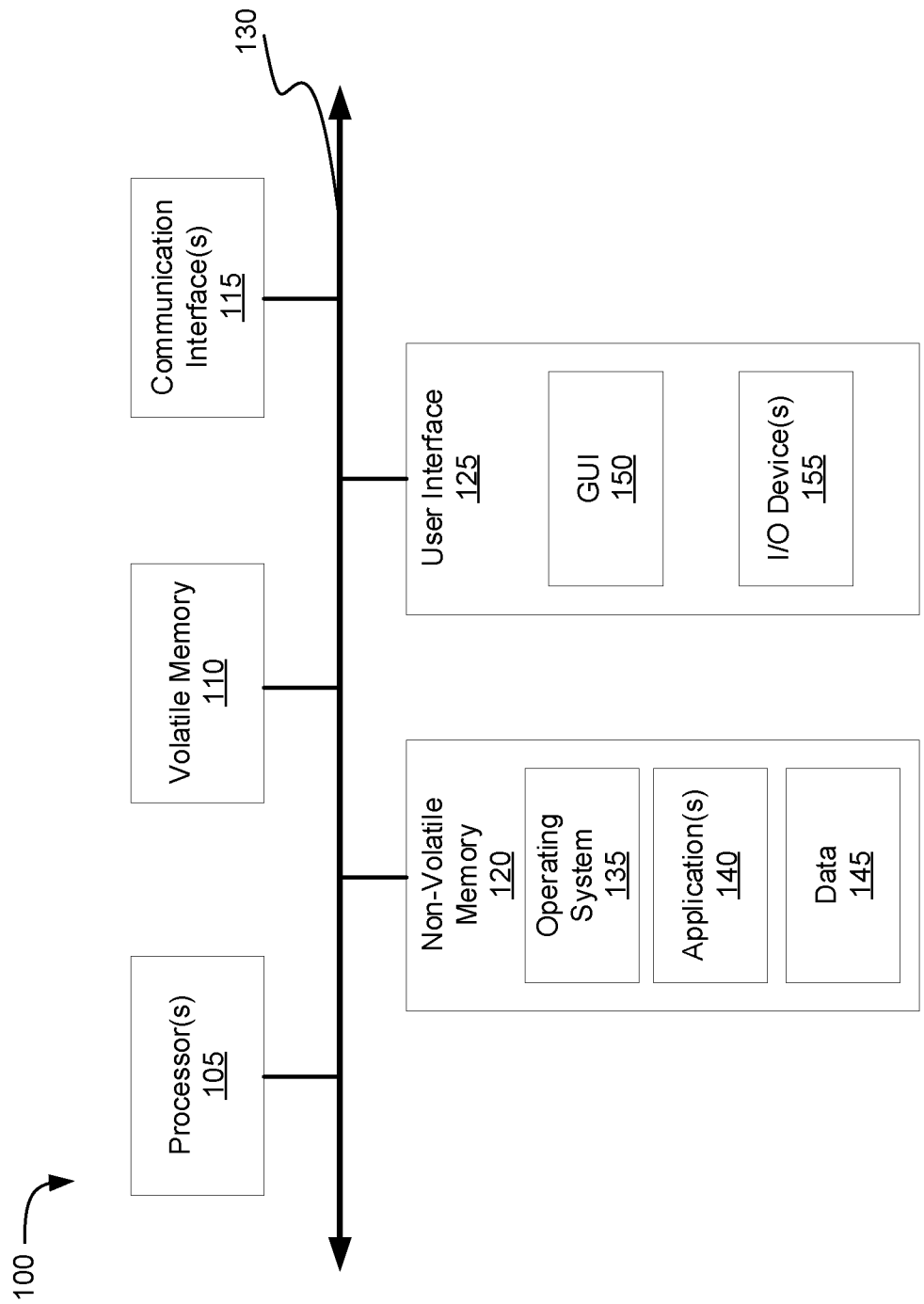
FIG. 1A is a block diagram of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein;

Section B describes resource management services for managing and streamlining access by clients to resource feeds; and Section C describes systems and methods for transferring data corresponding to scannable codes.

A. Computing Environment

Prior to discussing the specifics of embodiments of the systems and methods of an appliance and/or client, it may be helpful to discuss the computing environments in which such embodiments may be deployed.

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 115, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of: one or more applications, one or more desktop applications, and one or more desktop sessions in which one or more applications may execute.

Figure 1B:
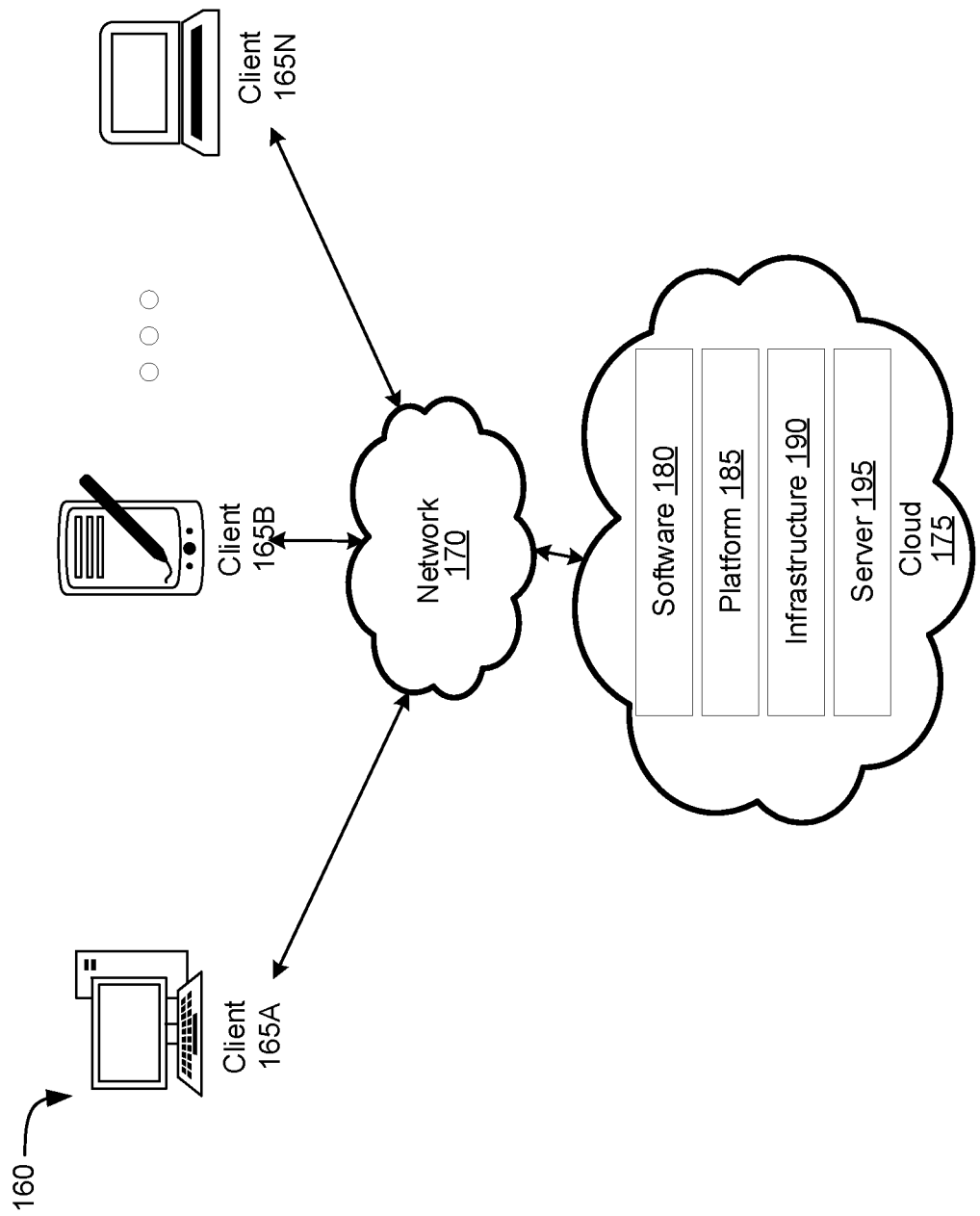
FIG. 1B is a block diagram depicting a computing environment comprising client device in communication with cloud service providers.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers, processing, memory, storage, applications, virtual machines, databases, software, hardware, analytics, and intelligence.

In embodiments, the computing environment 165 may provide client 165 with one or more resources provided by a network environment. The computing environment 165 may include one or more clients 165a-165n, in communication with a cloud 175 over one or more networks 170. Clients 165 may include, e.g., thick clients, thin clients, and zero clients. The cloud 175 may include back end platforms, e.g., servers, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 175 may include public servers that are maintained by third parties to the clients 165 or the owners of the clients 165. The servers may be located off-site in remote geographical locations as disclosed above or otherwise. Public clouds 175 may be connected to the servers over a public network 170. Private clouds 175 may include private servers that are physically maintained by clients 165 or owners of clients 165. Private clouds 175 may be connected to the servers over a private network 170. Hybrid clouds 175 may include both the private and public networks 170 and servers.

The cloud 175 may include back end platforms, e.g., servers, storage, server farms or data centers. For example, the cloud 175 can include or correspond to a server or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a Service (IaaS). The computing environment 160 can include Platform as a Service (PaaS) 185. The computing environment 160 can include serverless computing. The computing environment 160 can include Software as a Service (SaaS) 180. For example, the cloud 175 may also include a cloud based delivery, e.g. Software as a Service (SaaS) 180, Platform as a Service (PaaS) 185, and Infrastructure as a Service (IaaS) 190. IaaS 190 may refer to a user renting the use of infrastructure resources that are needed during a specified time period. IaaS 190 providers may offer storage, networking, servers or virtualization resources from large pools, allowing the users to quickly scale up by accessing more resources as needed. Examples of IaaS 190 include AMAZON WEB SERVICES provided by Amazon.com, Inc., of Seattle, Wash., RACK-SPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS 185 providers may offer functionality provided by IaaS 190, including, e.g., storage, networking, servers or virtualization, as well as additional resources such as, e.g., the operating system, middleware, or runtime resources. Examples of PaaS 185 include WINDOWS AZURE provided by Microsoft Corporation of Redmond, Wash., Google App Engine provided by Google Inc., and HEROKU provided by Heroku, Inc. of San Francisco, Calif. SaaS 180 providers may offer the resources that PaaS 185 provides, including storage, networking, servers, virtualization, operating system, middleware, or runtime resources. In some embodiments, SaaS 180 providers may offer additional resources including, e.g., data and application resources. Examples of SaaS 180 include GOOGLE APPS provided by Google Inc., SALESFORCE provided by Salesforce.com Inc. of San Francisco, Calif., or OFFICE 365 provided by Microsoft Corporation. Examples of SaaS 180 may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 165 may access IaaS 190 resources with one or more IaaS 190 standards, including, e.g., Amazon Elastic Compute Cloud (EC2), Open Cloud Computing Interface (OCCI), Cloud Infrastructure Management Interface (CIMI), or OpenStack standards. Some IaaS 190 standards may allow clients access to resources over HTTP, and may use Representational State Transfer (REST) protocol or Simple Object Access Protocol (SOAP). Clients 165 may access PaaS 185 resources with different PaaS 185 interfaces. Some PaaS 185 interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS 180 resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 165 may also access SaaS 180 resources through smartphone or tablet applications, including, e.g., Salesforce Sales Cloud, or Google Drive app. Clients 165 may also access SaaS 180 resources through the client operating system, including, e.g., Windows file system for DROPBOX.

In some embodiments, access to IaaS 190, PaaS 185, or SaaS 180 resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 2A:
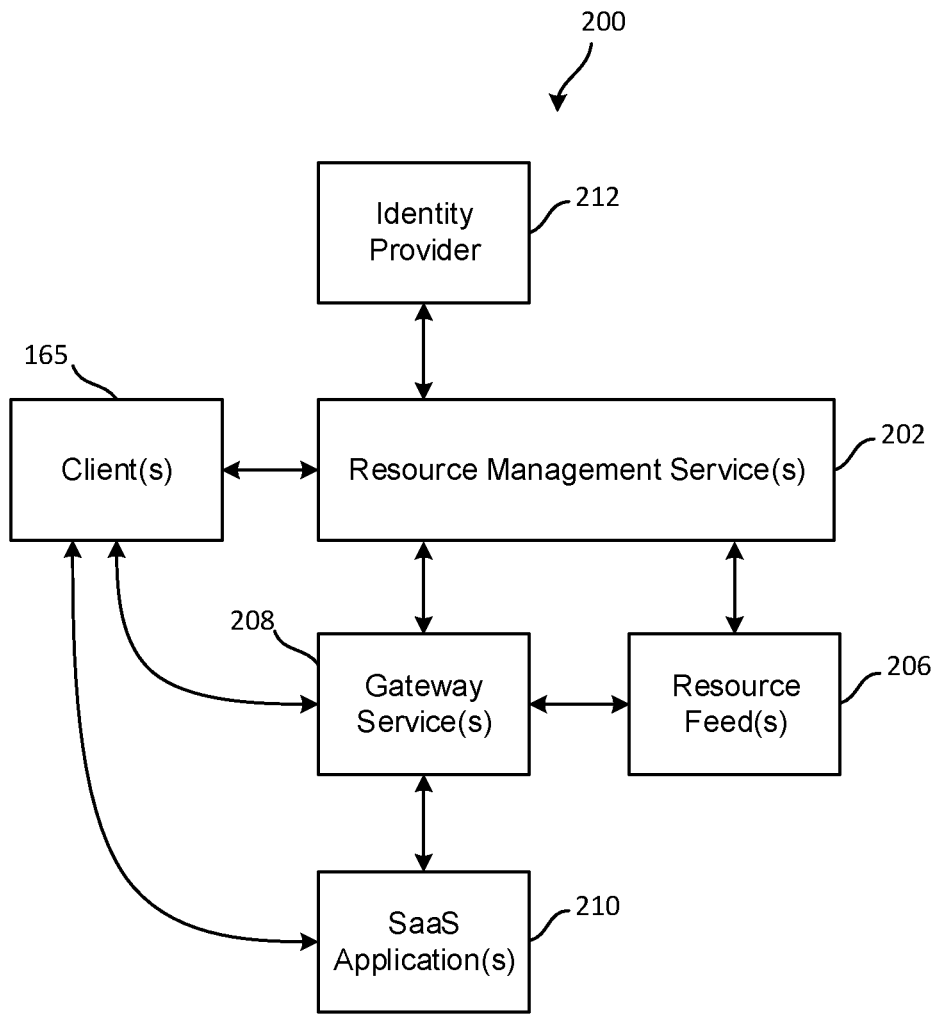
FIG. 2A is a block diagram of an example system in which resource management services may manage and streamline access by clients to resource feeds (via one or more gateway services) and/or software-as-a-service (SaaS) applications.

B. Resource Management Services for Managing and Streamlining Access by Clients to Resource Feeds FIG. 2A is a block diagram of an example system 200 in which one or more resource management services 202 may manage and streamline access by one or more clients 165 to one or more resource feeds 206 (via one or more gateway services 208) and/or one or more software-as-a-service (SaaS) applications 210. In particular, the resource management service(s) 202 may employ an identity provider 212 to authenticate the identity of a user of a client 165 and, following authentication, identify one of more resources the user is authorized to access. In response to the user selecting one of the identified resources, the resource management service(s) 202 may send appropriate access credentials to the requesting client 165, and the client 165 may then use those credentials to access the selected resource. For the resource feed(s) 206, the client 165 may use the supplied credentials to access the selected resource via a gateway service 208. For the SaaS application(s) 210, the client 165 may use the credentials to access the selected application directly.

The client(s) 165 may be any type of computing devices capable of accessing the resource feed(s) 206 and/or the SaaS application(s) 210, and may, for example, include a variety of desktop or laptop computers, smartphones, tablets, etc. The resource feed(s) 206 may include any of numerous resource types and may be provided from any of numerous locations. In some embodiments, for example, the resource feed(s) 206 may include one or more systems or services for providing virtual applications and/or desktops to the client(s) 165, one or more file repositories and/or file sharing systems, one or more secure browser services, one or more access control services for the SaaS applications 210, one or more management services for local applications on the client(s) 165, one or more internet enabled devices or sensors, etc. Each of the resource management service(s) 202, the resource feed(s) 206, the gateway service(s) 208, the SaaS application(s) 210, and the identity provider 212 may be located within an on-premises data center of an organization for which the system 200 is deployed, within one or more cloud computing environments, or elsewhere.

Figure 2B:
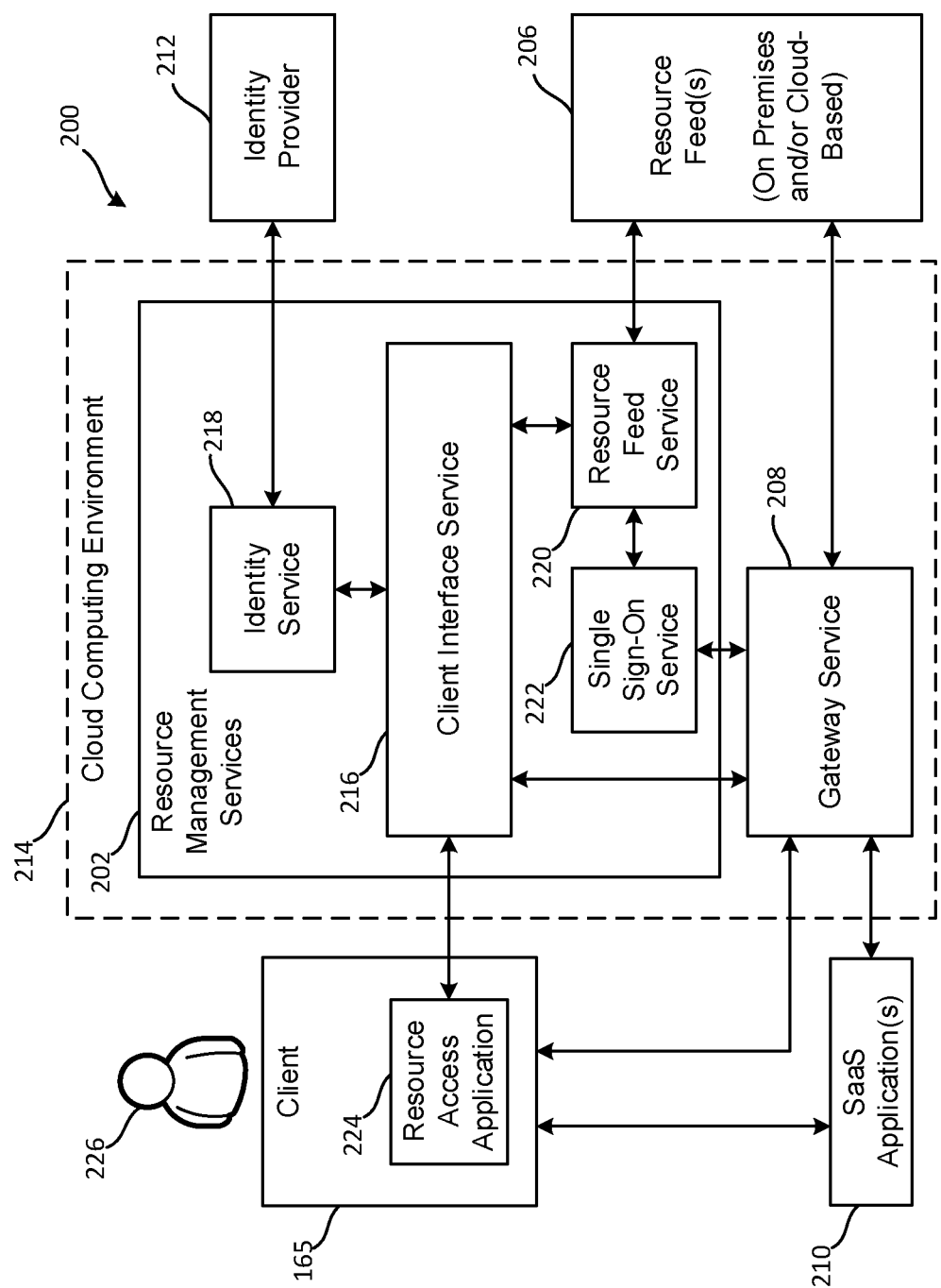
FIG. 2B is a block diagram showing an example embodiment of the system shown in FIG. 2A in which various resource management services as well as a gateway service are located within a cloud computing environment.

FIG. 2B is a block diagram showing an example embodiment of the system 200 shown in FIG. 2A in which various resource management services 202 as well as a gateway service 208 are located within a cloud computing environment 214. The cloud computing environment 214 may, for example, include Microsoft Azure Cloud, Amazon Web Services, Google Cloud, or IBM Cloud.

For any of illustrated components (other than the client 165) that are not based within the cloud computing environment 214, cloud connectors (not shown in FIG. 2B) may be used to interface those components with the cloud computing environment 214. Such cloud connectors may, for example, run on Windows Server instances hosted in resource locations and may create a reverse proxy to route traffic between the site(s) and the cloud computing environment 214. In the illustrated example, the cloud-based resource management services 202 include a client interface service 216, an identity service 218, a resource feed service 220, and a single sign-on service 222. As shown, in some embodiments, the client 165 may use a resource access application 224 to communicate with the client interface service 216 as well as to present a user interface on the client 165 that a user 226 can operate to access the resource feed(s) 206 and/or the SaaS application(s) 210. The resource access application 224 may either be installed on the client 165, or may be executed by the client interface service 216 (or elsewhere in the system 200) and accessed using a web browser (not shown in FIG. 2B) on the client 165.

As explained in more detail below, in some embodiments, the resource access application 224 and associated components may provide the user 226 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 224 is launched or otherwise accessed by the user 226, the client interface service 216 may send a sign-on request to the identity service 218. In some embodiments, the identity provider 212 may be located on the premises of the organization for which the system 200 is deployed. The identity provider 212 may, for example, correspond to an on-premises Windows Active Directory. In such embodiments, the identity provider 212 may be connected to the cloud-based identity service 218 using a cloud connector (not shown in FIG. 2B), as described above. Upon receiving a sign-on request, the identity service 218 may cause the resource access application 224 (via the client interface service 216) to prompt the user 226 for the user's authentication credentials (e.g., user-name and password). Upon receiving the user's authentication credentials, the client interface service 216 may pass the credentials along to the identity service 218, and the identity service 218 may, in turn, forward them to the identity provider 212 for authentication, for example, by comparing them against an Active Directory domain. Once the identity service 218 receives confirmation from the identity provider 212 that the user's identity has been properly authenticated, the client interface service 216 may send a request to the resource feed service 220 for a list of subscribed resources for the user 226.

In other embodiments (not illustrated in FIG. 2B), the identity provider 212 may be a cloud-based identity service, such as a Microsoft Azure Active Directory. In such embodiments, upon receiving a sign-on request from the client interface service 216, the identity service 218 may, via the client interface service 216, cause the client 165 to be redirected to the cloud-based identity service to complete an authentication process. The cloud-based identity service may then cause the client 165 to prompt the user 226 to enter the user's authentication credentials. Upon determining the user's identity has been properly authenticated, the cloud-based identity service may send a message to the resource access application 224 indicating the authentication attempt was successful, and the resource access application 224 may then inform the client interface service 216 of the successfully authentication. Once the identity service 218 receives confirmation from the client interface service 216 that the user's identity has been properly authenticated, the client interface service 216 may send a request to the resource feed service 220 for a list of subscribed resources for the user 226.

For each configured resource feed, the resource feed service 220 may request an identity token from the single sign-on service 222. The resource feed service 220 may then pass the feed-specific identity tokens it receives to the points of authentication for the respective resource feeds 206. Each resource feed 206 may then respond with a list of resources configured for the respective identity. The resource feed service 220 may then aggregate all items from the different feeds and forward them to the client interface service 216, which may cause the resource access application 224 to present a list of available resources on a user interface of the client 165. The list of available resources may, for example, be presented on the user interface of the client 165 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., SHAREFILE®, one or more secure browsers, one or more internet enabled devices or sensors, one or more local applications installed on the client 165, and/or one or more SaaS applications 210 to which the user 226 has subscribed. The lists of local applications and the SaaS applications 210 may, for example, be supplied by resource feeds 206 for respective services that manage which such applications are to be made available to the user 226 via the resource access application 224. Examples of SaaS applications 210 that may be managed and accessed as described herein include Microsoft Office 365 applications, SAP SaaS applications 210, Workday applications, etc.

For resources other than local applications and the SaaS application(s) 210, upon the user 226 selecting one of the listed available resources, the resource access application 224 may cause the client interface service 216 to forward a request for the specified resource to the resource feed service 220. In response to receiving such a request, the resource feed service 220 may request an identity token for the corresponding feed from the single sign-on service 222. The resource feed service 220 may then pass the identity token received from the single sign-on service 222 to the client interface service 216 where a launch ticket for the resource may be generated and sent to the resource access application 224. Upon receiving the launch ticket, the resource access application 224 may initiate a secure session to the gateway service 208 and present the launch ticket. When the gateway service 208 is presented with the launch ticket, it may initiate a secure session to the appropriate resource feed and present the identity token to that feed to seamlessly authenticate the user 226. Once the session initializes, the client 165 may proceed to access the selected resource.

When the user 226 selects a local application, the resource access application 224 may cause the selected local application to launch on the client 165. When the user 226 selects a SaaS application 210, the resource access application 224 may cause the client interface service 216 request a one-time uniform resource locator (URL) from the gateway service 208 as well a preferred browser for use in accessing the SaaS application 210. After the gateway service 208 returns the one-time URL and identifies the preferred browser, the client interface service 216 may pass that information along to the resource access application 224. The client 165 may then launch the identified browser and initiate a connection to the gateway service 208. The gateway service 208 may then request an assertion from the single sign-on service 222. Upon receiving the assertion, the gateway service 208 may cause the identified browser on the client 165 to be redirected to the logon page for identified SaaS application 210 and present the assertion. The SaaS application 210 may then contact the gateway service 208 to validate the assertion and authenticate the user 226. Once the user has been authenticated, communication may occur directly between the identified browser and the selected SaaS application 210, thus allowing the user 226 to use the client 165 to access the selected SaaS application 210.

In some embodiments, the preferred browser identified by the gateway service 208 may be a specialized browser embedded in the resource access application 224 (when the resource application is installed on the client 165) or provided by one of the resource feeds 206 (when the resource application 224 is located remotely), e.g., via a secure browser service. In such embodiments, the SaaS applications 210 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application 210, and (5) displaying watermarks, e.g., by overlaying a screen-based watermark showing the username and IP address associated with the client 165 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 206) for assessment of its security risk by a web filtering service. For approved URLs, the specialized browser may be permitted to access the link. For suspicious links, however, the web filtering service may have the client interface service 216 send the link to a secure browser service, which may start a new virtual browser session with the client 165, and thus allow the user to access the potentially harmful linked content in a safe environment.

In some embodiments, in addition to or in lieu of providing the user 226 with a list of resources that are available to be accessed individually, as described above, the user 226 may instead be permitted to choose to access a streamlined feed of event notifications and/or available actions that may be taken with respect to events that are automatically detected with respect to one or more of the resources. This streamlined resource activity feed, which may be customized for each user 226, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 165 to notify a user 226 of something that requires the user's attention (e.g., approval of an expense report, new course available for registration, etc.).

Figure 2C:
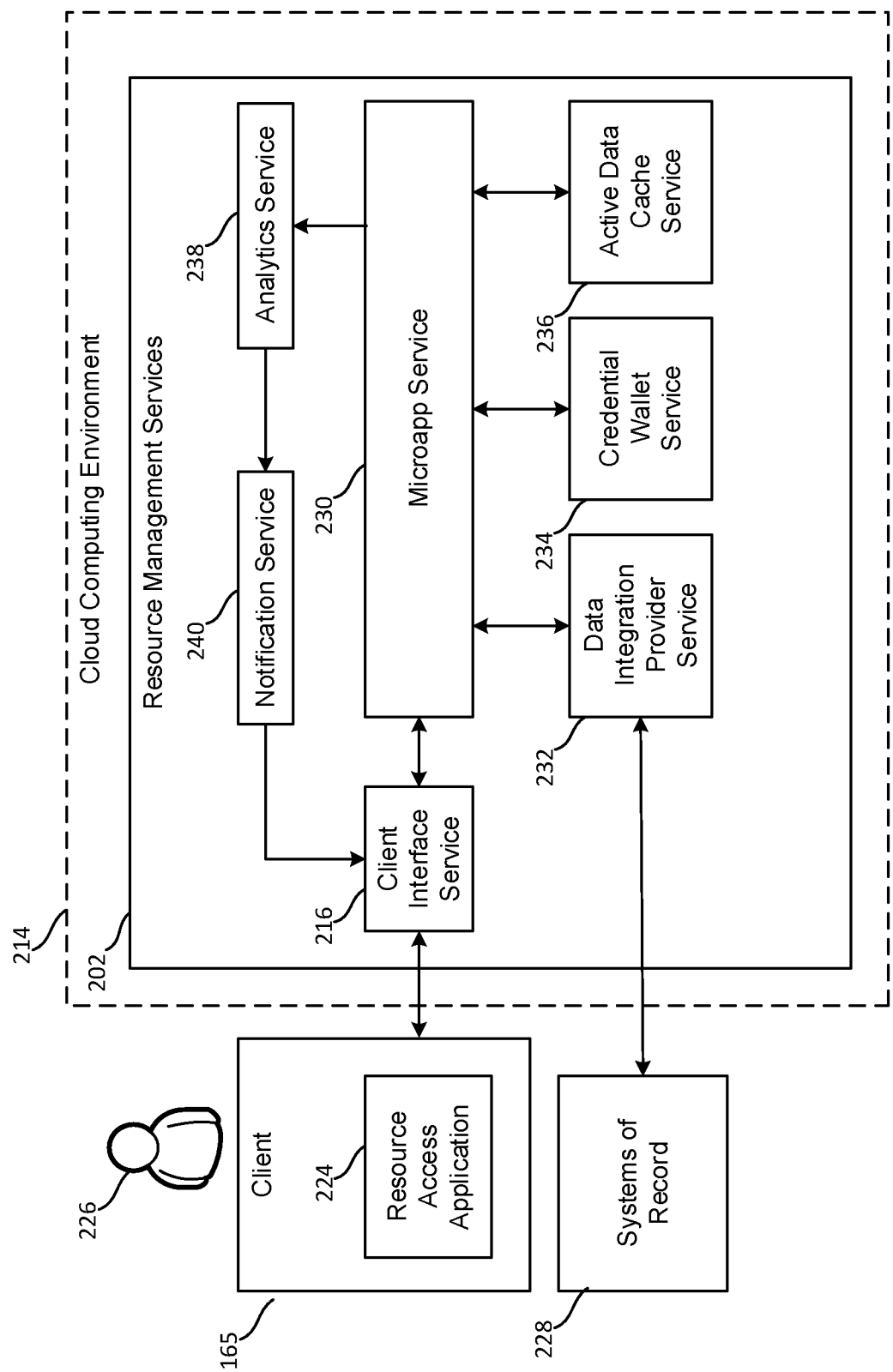
FIG. 2C is a block diagram similar to that shown in FIG. 2B but in which the available resources are represented by a single box labeled "systems of record," and further in which several different services are included among the resource management services.

FIG. 2C is a block diagram similar to that shown in FIG. 2B but in which the available resources (e.g., SaaS applications, web applications, Windows applications, Linux applications, desktops, file repositories and/or file sharing systems, and other data) are represented by a single box 228 labeled "systems of record," and further in which several different services are included within the resource management services block 202. As explained below, the services shown in FIG. 2C may enable the provision of a streamlined resource activity feed and/or notification process for a client 165. In the example shown, in addition to the client interface service 216 discussed above, the illustrated services include a microapp service 230, a data integration provider service 232, a credential wallet service 234, an active data cache service 236, an analytics service 238, and a notification service 240. In various embodiments, the services shown in FIG. 2C may be employed either in addition to or instead of the different services shown in FIG. 2B.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 224 without having to launch the native application. The system shown in FIG. 2C may, for example, aggregate relevant notifications, tasks, and insights, and thereby give the user 226 a dynamic productivity tool. In some embodiments, the resource activity feed may be intelligently populated by utilizing machine learning and artificial intelligence (AI) algorithms. Further, in some embodiments, microapps may be configured within the cloud computing environment 214, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 2C, the systems of record 228 may represent the applications and/or other resources the resource management services 202 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 202, and in particular the data integration provider service 232, may, for example, support REST API, JSON, OData-JSON, and 6ML. As explained in more detail below, the data integration provider service 232 may also write back to the systems of record, for example, using OAuth2 or a service account.

In some embodiments, the microapp service 230 may be a single-tenant service responsible for creating the microapps. The microapp service 230 may send raw events, pulled from the systems of record 228, to the analytics service 238 for processing. The microapp service 230 may, for example, periodically pull active data from the systems of record 228.

In some embodiments, the active data cache service 236 may be single-tenant and may store all configuration information and microapp data. It may, for example, utilize a per-tenant database encryption key and per-tenant database credentials.

In some embodiments, the credential wallet service 234 may store encrypted service credentials for the systems of record 228 and user OAuth2 tokens.

In some embodiments, the data integration provider service 232 may interact with the systems of record 228 to decrypt end-user credentials and write back actions to the systems of record 228 under the identity of the end-user. The write-back actions may, for example, utilize a user's actual account to ensure all actions performed are compliant with data policies of the application or other resource being interacted with.

In some embodiments, the analytics service 238 may process the raw events received from the microapps service 230 to create targeted scored notifications and send such notifications to the notification service 240.

Finally, in some embodiments, the notification service 240 may process any notifications it receives from the analytics service 238. In some embodiments, the notification service 240 may store the notifications in a database to be later served in a notification feed. In other embodiments, the notification service 240 may additionally or alternatively send the notifications out immediately to the client 165 as a push notification to the user 226.

In some embodiments, a process for synchronizing with the systems of record 228 and generating notifications may operate as follows. The microapp service 230 may retrieve encrypted service account credentials for the systems of record 228 from the credential wallet service 234 and request a sync with the data integration provider service 232. The data integration provider service 232 may then decrypt the service account credentials and use those credentials to retrieve data from the systems of record 228. The data integration provider service 232 may then stream the retrieved data to the microapp service 230. The microapp service 230 may store the received systems of record 228 data in the active data cache service 236 and also send raw events to the analytics service 238. The analytics service 238 may create targeted scored notifications and send such notifications to the notification service 240. The notification service 240 may store the notifications in a database to be later served in a notification feed and/or may send the notifications out immediately to the client 165 as a push notification to the user 226.

In some embodiments, a process for processing a user-initiated action via a microapp may operate as follows. The client 165 may receive data from the microapp service 230 (via the client interface service 216) to render information corresponding to the microapp. The microapp service 230 may receive data from the active data cache service 236 to support that rendering. The user 226 may invoke an action from the microapp, causing the resource access application 224 to send that action to the microapp service 230 (via the client interface service 216). The microapp service 230 may then retrieve from the credential wallet service 234 an encrypted Oauth2 token for the system of record for which the action is to be invoked, and may send the action to the data integration provider service 232 together with the encrypted Oauth2 token. The data integration provider service 232 may then decrypt the Oauth2 token and write the action to the appropriate system of record under the identity of the user 226. The data integration provider service 232 may then read back changed data from the written-to system of record and send that changed data to the microapp service 230. The microapp service 230 may then update the active data cache service 236 with the updated data and cause a message to be sent to the resource access application 224 (via the client interface service 216) notifying the user 226 that the action was successfully completed.

In some embodiments, in addition to or in lieu of the functionality described above, the resource management services 202 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 202 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 202 may, for example, parse these requests and respond because they are integrated with multiple systems on the back-end. In some embodiments, users may be able to interact with the virtual assistance through either the resource access application 224 or directly from another resource, such as Microsoft Teams. This feature may allow employees to work efficiently, stay organized, and deliver only the specific information they are looking for.

C. Systems and Methods for Transferring Data Corresponding to Scannable Codes

In many use cases, a user can paste on one device (e.g., mobile device) while the copying is performed on another device (e.g., laptop or workstation). Under one approach, users can open an application on their device to use optical character recognition (OCR) to scan what is being shown on the laptop/workstation screen. However, this approach is not data transfer (e.g., copy-paste method) because not all the data is shown on the screen. For example, the screen merely shows a link or a code block that is collapsed in the view, but if a user attempts to copy (e.g., presses ctrl-C), the data can be copied. Moreover, OCR might not be secure, accurate, or reliable. Depending on the application, the code can be a plain text OCR. However, clipboard content (e.g., generated from pressing ctrl-C) can include additional metadata the copy object and its formats. Such information can be lost in the OCR approach.

Another approach can involve cloud-based synchronization across devices. For example, data is copied in one browser instance on a sender device and the data is then available to paste on a recipient device. However, this approach might not work in all cases and has several problems. One problem may be that the sender device and the recipient device might have different operating systems but transferring data between operating systems is difficult. Another problem is that universal clipboards for transferring data among operating systems can require various continuity standards, connections (e.g., Wi-Fi, Bluetooth, etc.), and handoffs on the devices. Another problem is that one of the devices can also be required to sign into the data transfer mechanism. The copied content would then be uploaded to the cloud, but the cloud might not securely store the data or satisfy security rules of the users.

In addition, another problem may be that mobile devices might need to use data for data transfer. Even if one of the devices is connected to a local access network (e.g., Wi-Fi), the devices might be on different networks such that the data transfer might not work. For example, the mobile device might be on an unsecured guest network while the corporate device might be on the corporate network. A problem that arises out of this example is that the data transfer among devices that use unsecured networks can result in data leaks or data loss while the data is being transferred over the unsecured network. Another problem is that data among the devices might be synchronized to other connected devices, which causes excessive data transmissions when data only needs to be transferred during a paste operation.

To address the problems associated with sharing information by transferring data corresponding to scannable codes, a sender device can communicate with a service to indicate that the sender device copied data. The indication can cause the service to enable a recipient device to paste the data copied from the sender device. The sender device can receive a request to copy the data from the sender device to paste on the recipient device of the user. The sender device can display a scannable code (e.g., a quick-read (QR) code) corresponding to the copied data. The recipient device can scan the code to enable the recipient device to paste the copied data. The authentication with a central service while sharing the data via QR code in this fashion may enable transfer of data without the hassle of re-authenticating and prevent leakage or loss data, thus providing more privacy and security over the data.

Figure 3A:
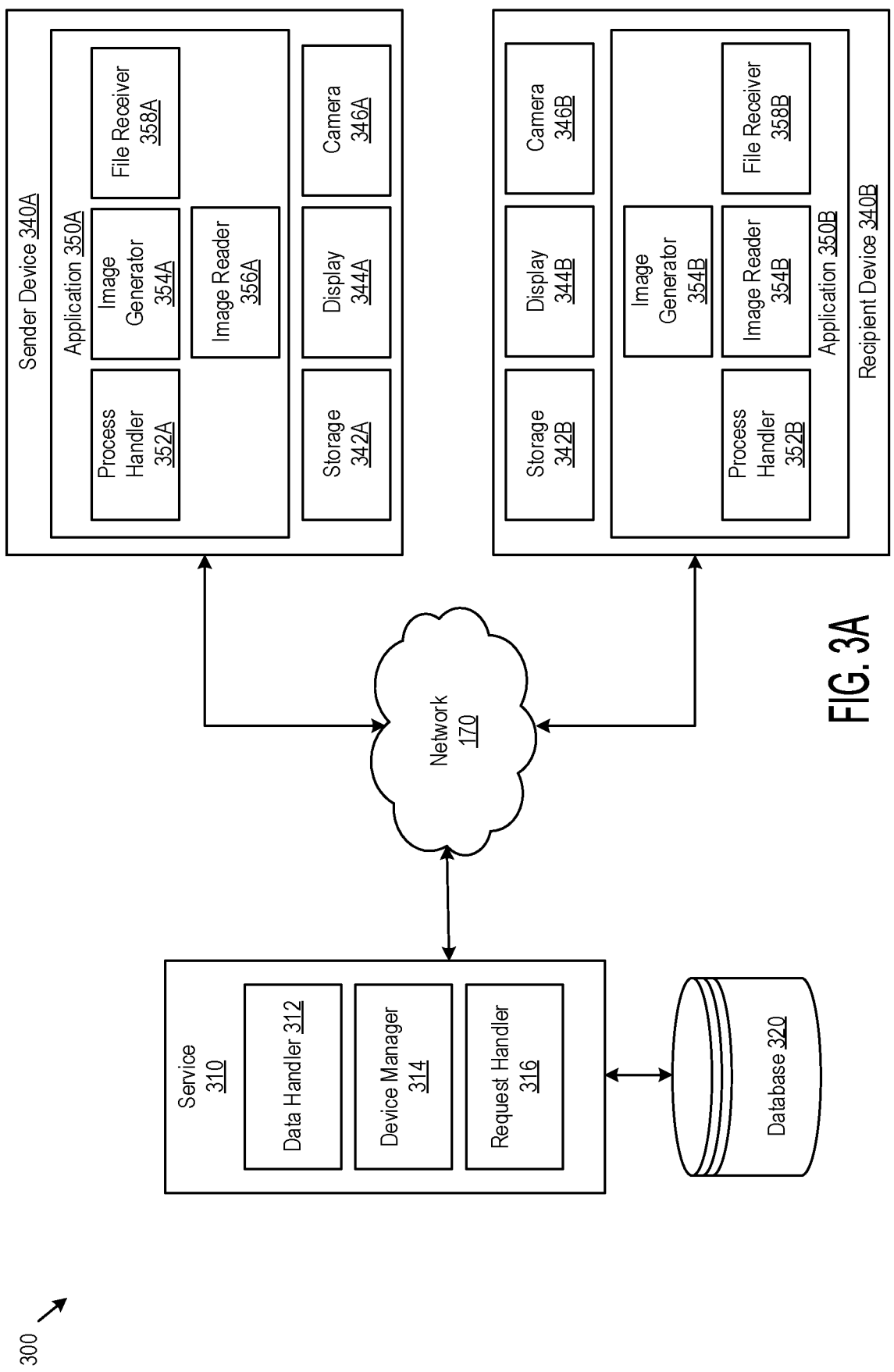
FIG. 3A is a block diagram of a system for transferring data corresponding to scannable codes in accordance with an illustrative embodiment.

Referring now to FIG. 3A, depicted is a block diagram of a system 300 for transferring data corresponding to scannable codes. In brief overview, the system 300 can include one or more networks 170A and 170B (hereinafter generally referred to as network 170), at least one service 310, a sender device 340A, and a recipient device 340B. The sender device 340A and recipient device 340B can be communicatively coupled to the service 310 via the network 170. The service 310 can include a data handler 312, a device manager 314, a request handler 316, and a database 320, among others. The sender device 340A can include storage 342A (generally referred to as storages 342), display 344A (generally referred to as displays 344), camera 346A (generally referred to as cameras 346), and application 350A (generally referred to as applications 350). The application 350A on the sender device 340A can include a process handler 352A (generally referred to as process handlers 352), an image generator 354A (generally referred to as image generators 354), an image reader 356A (generally referred to as image readers 356), and a file receiver 358A (generally referred to as file receivers 358). The recipient device 340B can include a storage 342B, a display 344B, a camera 346B, and an application 350B. The application 350B on the recipient device 340B can include a process handler 352B, an image generator 354B, an image reader 356B, and a file receiver 358B. In some embodiments, the process handlers 352 or the image readers 356 are not part of the applications 350, but instead executed by another application or at the operating system level of the devices 340.

The service 310 (including the data handler 312, the device manager 314, the request handler 316, and the database 320), the devices 340 (including the storages 342, the displays 344, and the cameras 346), the applications 350 (including the process handlers 352, image generators 354, image readers 356, and file receivers 358) the may be implemented using components described in connection with FIGS. 2A-C. In some embodiments, the service 310 may include, correspond to, or be a resource management service 202, the resource feed 206, the gateway service 208, the SaaS service 210, or the identity provider 212, or any combination thereof, among others. The devices 340 may correspond to or be the client 165.

Each of the above-mentioned elements or entities is implemented in hardware, or a combination of hardware and software, in one or more embodiments. Each component of the system 300 may be implemented using hardware or a combination of hardware or software detailed above in connection with FIGS. 1 and 2. The hardware includes circuitry such as one or more processors in one or more embodiments. Each of these elements or entities can include any application, program, library, script, task, service, process or any type and form of executable instructions executing on hardware of the data handler 312, the device manager 314, the request handler 316, the database 320, the storages 342, the displays 344, the cameras 346, the process handlers 352, the image generators 354, the image readers 356, and the file receivers 358.

Figure 3B:
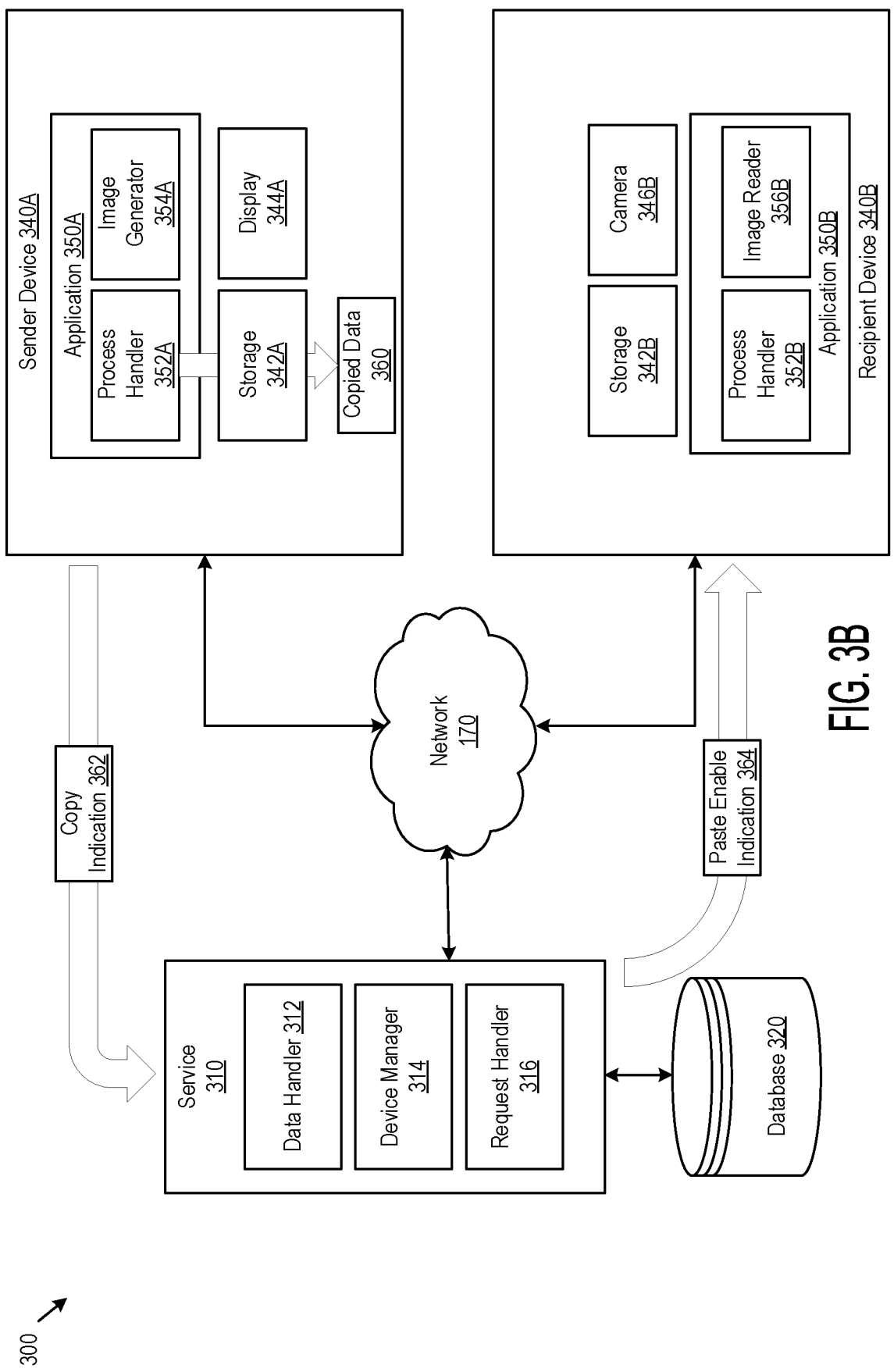
FIG. 3B is a block diagram of the system focusing on indicating copying and enabling pasting in accordance with an illustrative embodiment.

Referring now to FIG. 3B, depicted is a block diagram of the system 300 focusing on indicating copying and enabling pasting. The application 350A running on the sender device 340A and the application 350B running on the recipient device 340B may have established a separate connection with the service 310 over the network 170. For example, to access the resources hosted on the service 310, a user on the sender device 340A may have logged in via a prompt to enter authentication credentials displayed on the sender device 340A. Separately, a user on the recipient device 340B may have logged in via a prompt to enter authentication credentials displayed on the recipient device 340B. The user of the sender device 340A may be the same as the user of the recipient device 340B. Once successfully authenticated, both the application 350A running on the sender device 340A and the application 350B running on the recipient device 340B may access various resources on the service 310. Both the application 350A and 350B may have event listeners to facilitate the copying of data from the sender device 340A onto the recipient device 340B.

Subsequently, the process handler 352A can receive a command to copy data 360. The data 360 may correspond to various forms of information, such as text, an image, audio content, video content, or file, among others accessible at the sender device 340A. In some embodiments, the application 350A can display a user interface via which to receive the command to copy the data 360. The application 350A can present, render, or otherwise display the user interface and the data 360 to be copied via the display 344A. The process handler 352A may detect the command to copy the data 360 through the user interface of the application 350A. For example, the user of the application 350A may highlight a portion of text and images on a document to which to copy as the data 360.

In some embodiments, the process handler 352A may identify the command to copy from an interaction with an actionable item to command to copy the data 360. The application 350A can display, render, or present the actionable item (e.g., button) in the user interface (e.g., via the display 344A). The actionable item can correspond to or be associated with the copied data 360. For example, the actionable item can reference the copied data in a memory address of the storage 342A. In some embodiments, the actionable item may be a menu or interface for the user to select data to copy among the data stored by the storage 342A. The application 350A can detect the user interacting with the actionable item. In some embodiments, responsive to the detection, the application 350A can identify the command to copy the data from the process handler 352A to the file receiver 358B. For example, the application 350A can detect a touch selection or input keypress to select the actionable item. The application 350A can identify or extract the data selected by the user for copying.

Upon receipt of the command, the process handler 352A may identify the data 360 to be copied. The process handler 352A can receive the command via a user interface (UI) of the application 350A. In some embodiments, the process handler 352A can automate or generate the UI. The process handler 352A can generate the UI to include UI menu items under a file menu. The menu items can correspond to data to be copied or pasted. The process handler 352A can configure event handlers to detect interactions with the UI menu items. For example, the process handler 352 can detect or identify, via the event handlers, when the users clicks or selects the UI menu items under the file menu to copy or paste data. In some embodiments, the process handler 352A can configure copy and paste event handlers in the session, operating system, or application startups of the sender device 340A. The process handler 352A can receive the command using the copy/paste event handlers. The process handler 352A can copy the data from the storage 342A and into a temporary storage (e.g., clipboard). For example, the process handler 352A can include a copy and paste function to copy the data from the storage 342A and into the temporary storage.

Upon copying of the data 360, the process handler 352A can transmit the copy indication 362. In some embodiments, the process handler 352A can transmit the copy indication 362 responsive to receiving an indication of the copying of the data 360 or identifying that the data 360 has been copied. In some embodiments, the process handler 352A can transmit the copy indication 362 responsive to the process handler 352A receiving the selection of the actionable items to display the scannable code 370. In some embodiments, the application 350A may receive a preference (e.g., from a user) to configure when the copy indication 362 is transmitted. For example, the preference can indicate that the process handler 352A is to transmit the copy indication 362 responsive to the copying of the data 360 or responsive to receiving the selection of the actionable items. The process handler 352A can transmit the copy indication 362 based on the preference. The copy indication 362 may indicate that the process handler 352A copied the data into the copied data 360 of the storage 342A. The copy indication 362 can be a message including or identifying information about the copied data 360. The copy indication 362 can include identifiers of the sender device 340A and the application 350A that copied the data. The copy indication 362 can include a timestamp of when the data was copied. In some embodiments, the copy indication 362 can include identifiers of the recipient device 340B and the application 350B for which the data was copied to be pasted. The process handler 352A can identify that the user of the sender device 340A caused generation of the copied data 360.

In some embodiments, the process handler 352A can transmit the copy indication 362 responsive to the process handler 352A receiving the selection of the actionable item to display the scannable code 370. The application 350A can cause the display 344A to display an actionable item to request generation of the scannable code 370. The application 350A can include the actionable item (e.g., button) in a user interface of the application 350A. In some embodiments, the actionable item is a menu or interface for the user to select a type (e.g., QR code or barcode) or size (e.g., full screen or icon) of the scannable code 370 to generate. The application 350A can detect the user interacting with the actionable item. In some embodiments, responsive to the detection, the application 350A can identify the request to generate the scannable code 370. For example, the application 350A can detect a touch selection or input keypress to select the actionable item. Based on the selection, the image generator 354A can identify or extract the type or size of scannable code 370 that was requested. Upon detection, the process handler 352A may provide the copy indication 362 to the service 310.

The data handler 312 executing on the service 310 can retrieve, identify, or otherwise receive the copy indication 362 from the process handler 352A. In some embodiments, the data handler 312 can receive the copy indication 362 from the process handler 352A. In some embodiments, the data handler 312 can receive, from the process handler 352A, the copy indication 362 that the user of the sender device 340A generated copied data 360. In some embodiments, the copy indication 362 may correspond to the selection of the actionable item to display the scannable code 370 on the display 344A of the sender device 340A. With the receipt from the sender device 340A, the data handler 312 may store and maintain the copy indication 362 on the database 320. In some embodiments, the data handler 312 may have received multiple copy indications 362 from multiple devices 340.

Upon receipt of the copy indication 362, the device manager 314 can send, provide, or otherwise transmit at least one paste enable indication 364 to the recipient device 340B. The paste enable indication 364 may indicate to the recipient device 340B that the application 350B is permitted to transfer the copied data 360 from the sender device 340A. The paste enable indication 364 may be a message include configuration information for enabling transfer of the data from the sender device 340A, such as an identifier for the sender device 340A. In some embodiments, the device manager 314 can identify a plurality of devices 340 (including the recipient device 340B) associated with the user to paste the data from the storage 342A of the sender device 340A. With the identification, the device manager 314 may send the paste enable indication 364 to each device 340, such as the recipient device 340B as depicted.

In some embodiments, in conjunction with the paste enable indication 364, the device manager 314 can identify a list of devices 340 from which the recipient device 340B is permitted to paste the data 360. As discussed above, the data handler 312 may store and identify the copy indications 362 received from the multiple devices 340 on the database 320. The identification of the list of devices may be based on the copy indications 362 maintained on the database 320. With the identification, the device manager 314 may generate the list from which to select at least one of the devices 340 to transfer the copied data 360. In some embodiments, the list can be included or part of the enabling of paste enable indication 364. In some embodiments, the device manager 314 may provide the list separately from the paste enable indication 364.

Upon receipt of the paste enable indication 364, the process handler 352B of the recipient device 340B can enable pasting of the copied data 360. The pasting of the copied data 360 may be via the display 344A of the sender device 340A and camera 346B of the recipient device 340B, and not via the network 170 through the service 310. In some embodiments, the process handler 352B can extract or identify the settings or the configurations from parsing the paste enable indication 364. To enable paste, the process handler 352B may include a user element in an interface for the application 350B to initiate copy and pasting of the data 360 from the sender device 340A. For example, the process handler 352B may include a menu item labeled "paste using QR code" option in the application 350B. In some embodiments, the process handler 352B can execute independently of the application 350B. The process handler 352B operating independently can display of a UI option responsive to identifying a command to paste data (e.g., user presses Ctrl-V keys).

In some embodiments, the process handler 352B can receive the list from which to select at least one of the devices 340 to transfer the data 360. The list may be received from the service 310, in conjunction with or separately from the paste enable indication 364. Upon receipt, the application 350B can display the list on the display 344B. For example, when the "paste using QR code" option is activated, the process handler 352B may display the list.

Figure 3C:
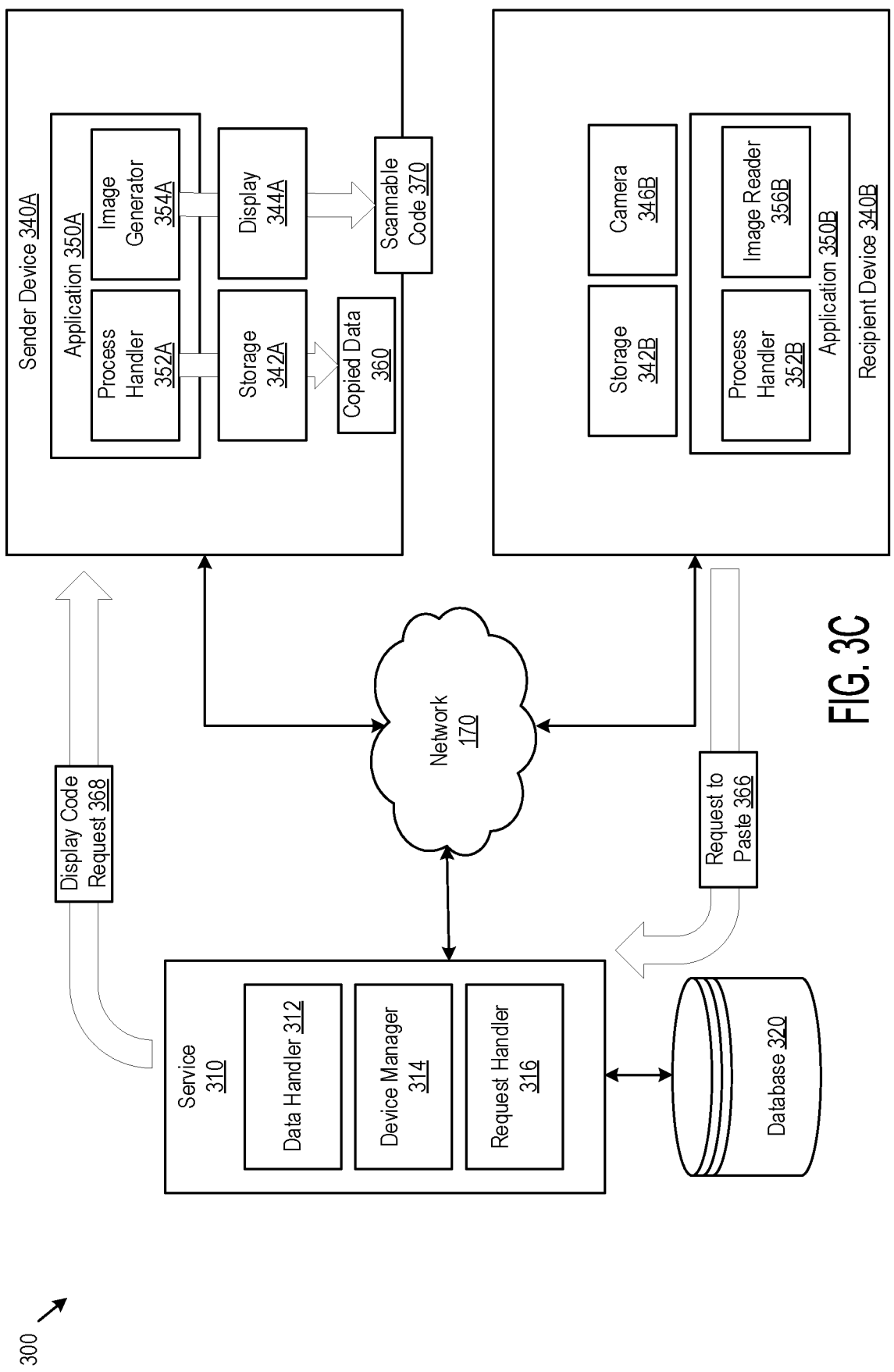
FIG. 3C is a block diagram of the system focusing on requesting display of a scannable code in accordance with an illustrative embodiment.

Referring now to FIG. 3C, depicted is a block diagram of the system 300 focusing on requesting display of a scannable code 370. Subsequent to enabling paste, the process handler 352B of the recipient device 340B can identify, detect, or receive a command to paste the copied data 360 from the sender device 340A. In some embodiments, the process handler 352B may detect the command to paste through a user interaction with the application 350B. For example, the process handler 352B can detect a user interaction activating the "paste using QR code" option via the application 350B. In some embodiments, the process handler 352B may detect the command to paste through an event to activate the camera 346B on the recipient device 340B. For example, the user may open a program to acquire an image through the camera 346B, and the process handler 352B may detect the opening of the program as the command to paste the copied data 360. By detecting the command to paste based on the camera 346B, the user is not required to launch any additional camera or imaging scanning applications. For example, the user does not need to perform additional steps such as launching a specific application for scanning codes, using the application to scan the code, and then pasting the data. Instead, activation of the camera 346B is sufficient for the process handler 352B to detect the command to paste.

In some embodiments, the process handler 352B may identify the sender device 340A from which the data 360 is to be transferred onto the recipient device 340B. In some embodiments, the process handler 352B may identify the sender device 340A from the paste enable indication 364. In some embodiments, the process handler 352B may identify the sender device 340A from the selection of the device from the list. As discussed above, the list may be to select at least one of the devices 340 to transfer the data 360. With the identification, the process handler 352A may include the identifier for the sender device 340A for the command.

Upon receipt of the command, the process handler 352B may generate a request to paste 366 the copied data 360 to transmit to the service 310. The request to paste 366 may include information to facilitate the transfer of the data 360 from the sender device 340A to the recipient device 340B. For example, the information of the request to paste 366 may include the identifier for the sender device 340A. The identifier for the sender device 340A may correspond to the selection from the list of devices presented at the recipient device 340B. In some embodiments, the process handler 352B may include a time stamp corresponding to a time at which the command to paste occurred. With the generation, the process handler 352B of the recipient device 340B can send, provide, or otherwise transmit the request to paste 366 to the service 310. In some embodiments, the process handler 352B may omit the transmission of the request to paste 366 to paste, even when the command to paste is received at the recipient device 340B.

In turn, the request handler 316 can retrieve, identify, or otherwise receive the request to paste 366 from the recipient device 340B. Upon receipt, the request handler 316 may identify the sender device 340A from which to transfer the copied data 360. The request handler 316 can extract or identify the identifier for the sender device 340A from the request to paste 366. Upon the identification from the request to paste 366, the request handler 316 may identify the sender device 340A.

In some embodiments, the request handler 316 can identify the sender device 340A using the timestamp identified in the request to paste 366. In some embodiments, the request handler 316 may use a time stamp corresponding to a time of request of the request to paste 366. The request handler 316 can compare the timestamp to the timestamp of receipt of the copy indications 362 maintained on the database 320. Based on the comparison, the request handler 316 can identify at least one of devices 340 that indicated copying of data (e.g., copied data 360) prior to the receipt of the request to paste 366 the copied data 360. For example, the request handler 316 may identify the sender device 340A at which the data 360 was most recently copied.

With the identification, the request handler 316 can generate a code request 368 to transmit to the sender device 340A. The code request 368 may specify the sender device 340A to display of at least one scannable code 370 on the display 344A. In some embodiments, the code request 368 may correspond to the request to paste 366 forwarded by the request handler 316 to the sender device 340A. Upon generation, the request handler 316 can send, provide, or otherwise transmit the code request 368 to the sender device 340A. In some embodiments, the request handler 316 may omit the transmission of the code request 368, when no request to paste 366 is received.

The process handler 352A can retrieve, identify, or otherwise receive the code request 368 from the service 310. The code request 368 can specify that the process handler 352A is to initiate transferal of the data from the storage 342A of the sender device 340A to paste to the recipient device 340B. In some embodiments, the process handler 352A can identify the interaction with the actionable item displayed on the application 350A as the receipt of the code request 368. As discussed above, the process handler 352A may display the actionable item to display a scannable code to initiate the transfer the copied data 360 from the sender device 340A to the recipient device 340B. In some embodiments, the process handler 352A may access the storage 342A to fetch, retrieve, or identify the copied data 360, upon receipt of the code request 368.

Upon receiving the code request 368, the image generator 354A can generate the scannable code 370 corresponding to the copied data 360. In some embodiments, the image generator 354A may use the copied data 360 from the storage 342A to generate the scannable code 370. The image generator 354A may write, create, or generate the scannable code 370 in accordance with a binary code, such as binary Bose-Chaudhuri-Hocquenghem (BCH) codes or binary Reed-Solomon codes, among others. In some embodiments, the image generator 354A may include metadata to the copied data 360 in generating the scannable code 370. The metadata may include, for example, an account identifier for the user of the sender device 340A, an application name of the application 350A, a device identifier for the sender device 340A, and the time stamp identifying the time at which the data is copied, a type of the copied data 360 (e.g., alphanumeric text, numerical value, image, video, audio, or other file), a format of the copied data 360 (e.g., as indicated in file extension indicated file format), among others. When included, the scannable code 370 can include or correspond to a representation of the copied data 360 as well as the metadata. In some embodiments, the image generator 354A may generate a sequence of scannable codes 370 for the copied data 360. Each scannable code 370 in the sequence may correspond to a portion of the copied data 360.

Upon generation, the image generator 354A may render, present, or otherwise display the scannable code 370. The display of the scannable code 370 may be for acquisition or scanning by the camera 346B on the recipient device 340B. In some embodiments, the image generator 354A may present or display an actionable item in the user interface of the application 350A to display the scannable code 370 corresponding to the copied data 360, as discussed above. Upon detecting user interaction with the actionable item on the user interface, the image generator 354A may display the scannable code 370. In some embodiments, the image generator 354A may display the scannable code 370 for a set period of time (e.g., 30 seconds to 30 minutes), during which the camera 346B of the recipient device 340B is to scan the scannable code 370. In some embodiments, the image generator 354A may present the sequence of scannable codes 370 corresponding to the copied data 360.

Figure 3D:
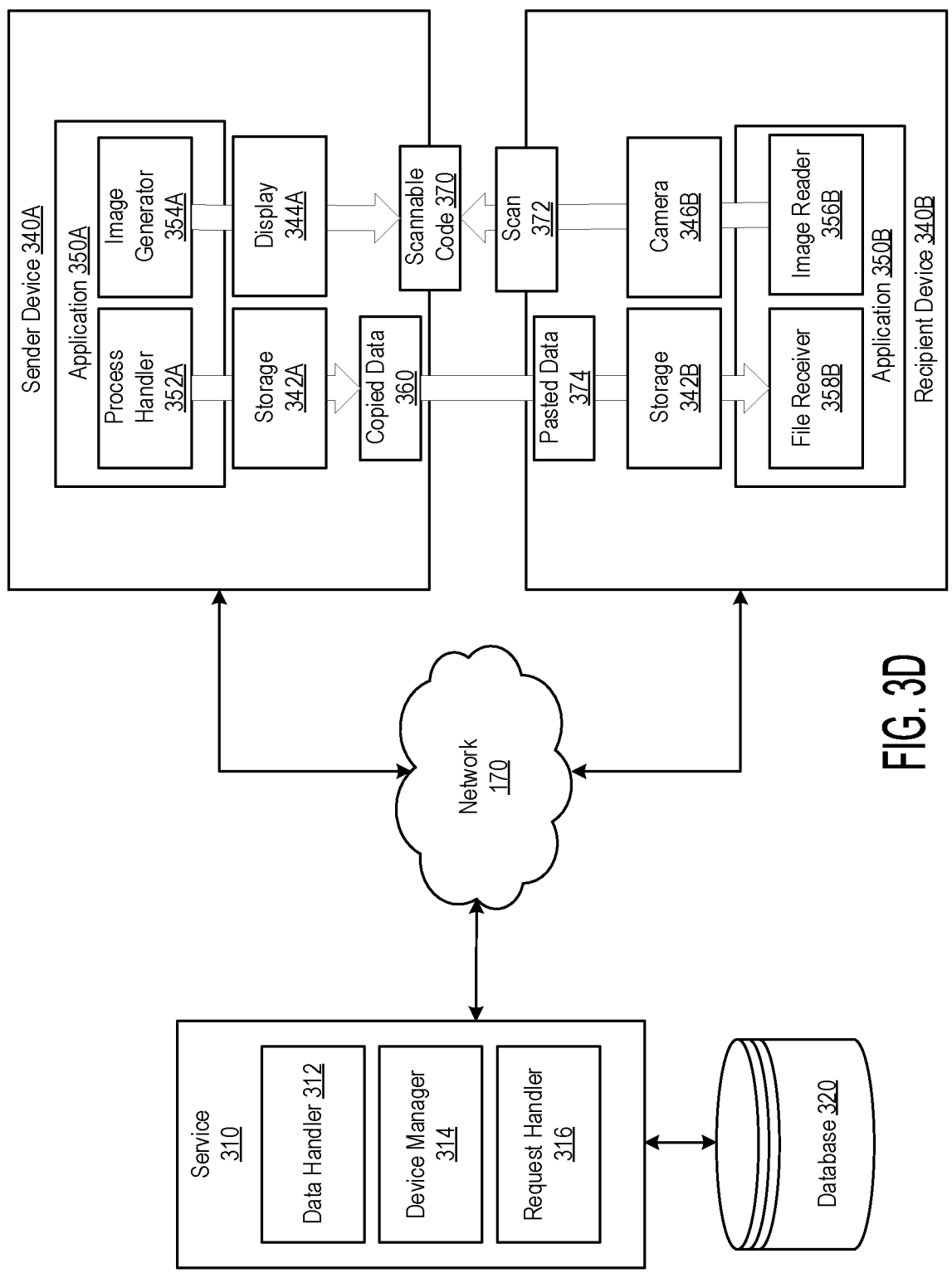
FIG. 3D is a block diagram of the system focusing on scanning of the scannable code to transfer the data in accordance with an illustrative embodiment.

Referring now to FIG. 3D, depicted is a block diagram of the system 300 focusing on scanning of the scannable code 370 to transfer the copied data 360. As the scannable code 370 is displayed on the display 344A of the sender device 340A, the image reader 356B can perform a scan 372 of the scannable code 370 via the camera 346B. In some embodiments, the image reader 356B may perform the scan 372 of the sequence of scannable codes 370 presented on the display 344A via the camera 346B. By performing the scan 372, the image reader 356B may process the acquisition of the scannable code 370 to reconstruct the copied data 360 as pasted data 374. In some embodiments, the pasted data 374 may include the copied data 360 and the metadata included in the scannable code 370. In some embodiments, the image reader 356B may reconstruct the copied data 360 as the pasted data 374 in accordance with the binary code, such as binary Bose-Chaudhuri-Hocquenghem (BCH) codes or binary Reed-Solomon codes, among others.

Upon completion of the scanning, the file receiver 358B can store the pasted data 374 onto the storage 342B. In some embodiments, the file receiver 358B can store the pasted data 374 on a clipboard of the recipient device 340B. Subsequent pasting operations (e.g., user presses Ctrl-V) on the recipient device 340B of the same data can be performed by using the clipboard data. By using the clipboard data, regeneration and rescanning of the scannable code 370 to paste the same pasted data 374 can be avoided. In some embodiments, the file receiver 358B may present or display the pasted data 374 within the user interface of the application 350B. For example, the copied data 360 may include text and images from a web document accessed via the application 350A, as well as metadata. The file receiver 358B upon reassembly from the scannable code 370 may display the pasted data 374 including the text, images, and metadata through the user interface on the application 350B.

In addition, the file receiver 358B may transmit, send, or provide a notification to the service 310. The provision of the notification by the file receiver 358B can be performed, when the pasted data 374 is fully reconstructed from the scannable code 370. The notification can indicate that the scanning of the scannable code 370 is completed at the recipient device 340B. The notification may include the identifier for the sender device 340A or the identifier for the recipient device 340B, or any combination thereof, among others.

Upon receipt of the notification, the request handler 316 can identify or determine that the scan 372 of the scannable code 370 by the recipient device 340B is complete. The request handler 316 may parse the notification to identify the identifier for the sender device 340A or the identifier for the recipient device 340B. With the determination, the request handler 316 may generate an indication of completion to send to the sender device 340A. The indication of complete may be to terminate displaying of the scannable code 370 by the image generator 354A via the display 344A. Once generated, the request handler 316 may send the indication to the sender device 340A. In response to receipt, the image generator 354A may cease or terminate displaying of the scannable code 370 via the display 344A.

In some embodiments, in response to receipt, the image generator 354A can generate and present a new scannable code. For example, if the copied data 360 includes a sequence of scannable codes, the image generator 354A can display additional scannable codes to be scanned such that devices 340 can transfer and reconstruct the data 360 corresponding to the sequence. In response to receipt of all the scannable codes corresponding to the copied data 360, the image generator 354A can generate and present a new scannable code corresponding to additional data. For example, if the devices 340 are exchanging several data items (e.g., a folder with multiple files wherein each file corresponds to a different item of copied data corresponding to a respective scannable code), the image generator 354A can display additional scannable codes to be scanned such that devices 340 can transfer several data items to reconstruct together (e.g., as a folder with files).

In this manner, by facilitating transfer and reconstruction of the copied data 360 via scannable codes 370 acquired by the camera 346B of the recipient device 340B, the system 300 may resolve issues arising in approaches that solely rely on optical characters scanning (OCR) that leads to incomplete or inaccurate transfers of data. Furthermore, the system 300 can account for the repeated and excessive communications from network-based transfers of data. As such, the system 300 may provide for improved privacy and security as well as integrity of data transfers between multiple devices 340.

Figure 4A:
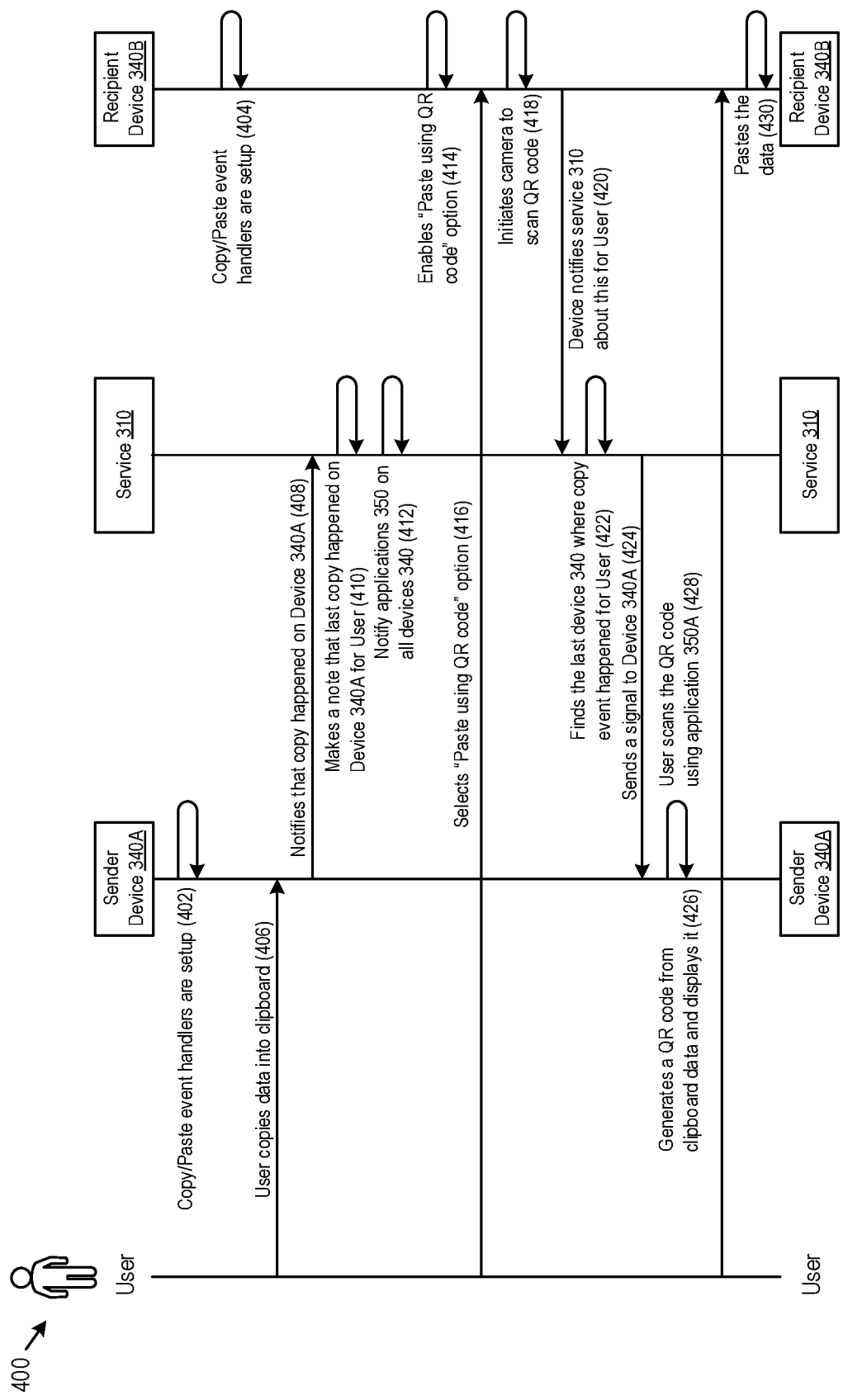
FIG. 4A is flow diagram of a flow for copy-pasting data using scannable codes generated upon pasting of data in accordance with an illustrative embodiment.

Now referring to FIG. 4A, depicted is flow diagram of a flow 400 for copy-pasting data using scannable codes 370 (e.g., QR codes) generated upon pasting of data in accordance with an illustrative embodiment. The flow 400 can include configuring copy/paste event handlers on the sender device 340A (402). The flow 400 can include configuring copy/paste event handlers on the recipient device 340B (404). The flow 400 can include the sender device 340A copying the data into a clipboard on the sender device 340A (406). The flow 400 can include the sender device 340A notifying the service 310 that the sender device 340A copied the data (408). The flow 400 can include the service 310 making a note that a copy happened on the sender device 340A (410). The flow 400 can include the service 310 notifying applications 350 on all the devices 340 about the copied data (412). In some embodiments, the service 310 does not notify the application 350A executing on the sender device 340A (do not need to notify where the copy happened).

The flow 400 can include the service 310 enabling a "Paste using QR code" option (414). The flow 400 can include the recipient device 340B detecting a selection of the "Paste using QR code" option (416). The flow 400 can include the recipient device 340B initiating a camera to scan the QR code (418). The flow 400 can include the recipient device 340B notifying the service 310 about the initiating camera (420). The flow 400 can include the service finding or identifying the device 340 where the copy event occurred (422). The flow 400 can include sending a signal to the identified sender device 340A (424). The flow 400 can include the sender device 340A generating a QR code from the clipboard data and displaying the QR code (426). The flow 400 can include the sender device 340A detecting that the user scanned the QR code using application 350B (428). The flow 400 can include the recipient device 340B pasting the pasted data 374 from the copied data 360 of the sender device 340A (430).

Figure 4B:
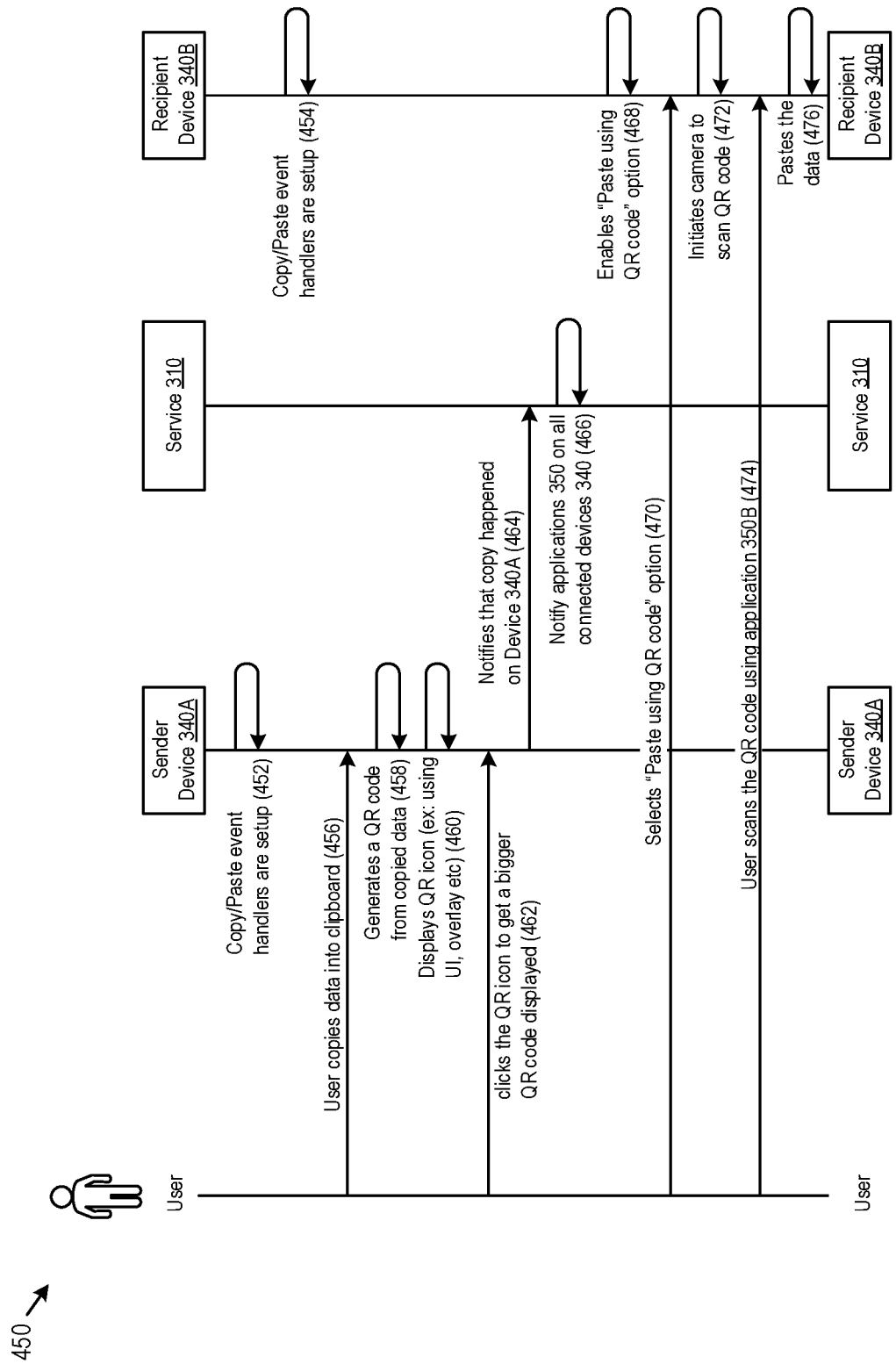
FIG. 4B is flow diagram of a flow for copy-pasting data using scannable codes generated upon copying of data in accordance with an illustrative embodiment.

Now referring now to FIG. 4B, depicted is flow diagram of a flow 450 for copy-pasting data using scannable codes 370 (e.g., QR codes) generated upon copying of data in accordance with an illustrative embodiment. The flow 450 can include configuring copy/paste event handlers on the sender device 340A (452). The flow 450 can include configuring copy/paste event handlers on the recipient device 340B (454). The flow 450 can include the sender device 340A copying the data into a clipboard on the sender device 340A (456). The flow 450 can include the sender device 340A generating a QR code (458). The flow 450 can include displaying the QR code (e.g., using UI, overlay, etc.) (460). The flow 450 can include the sender device 340A detecting clicks on the QR icon to get a bigger QR code displayed on the sender device 340A (462).

The flow 450 can include the service 310 making a note that a copy happened on the sender device 340A (464). The flow 450 can include the service 310 notifying applications 350 on all the device 340 about the copied data (466). The flow 450 can include the service 310 enabling a "Paste using QR code" option (468). The flow 450 can include the recipient device 340B detecting a selection of the "Paste using QR code" option (470). The flow 450 can include the recipient device 340B initiating a camera to scan the QR code (472). The flow 450 can include the sender device 340A detecting that the user scanned the QR code using application 350B (474). The flow 450 can include the recipient device 340B pasting the data from the sender device 340A (476).

Figure 5:
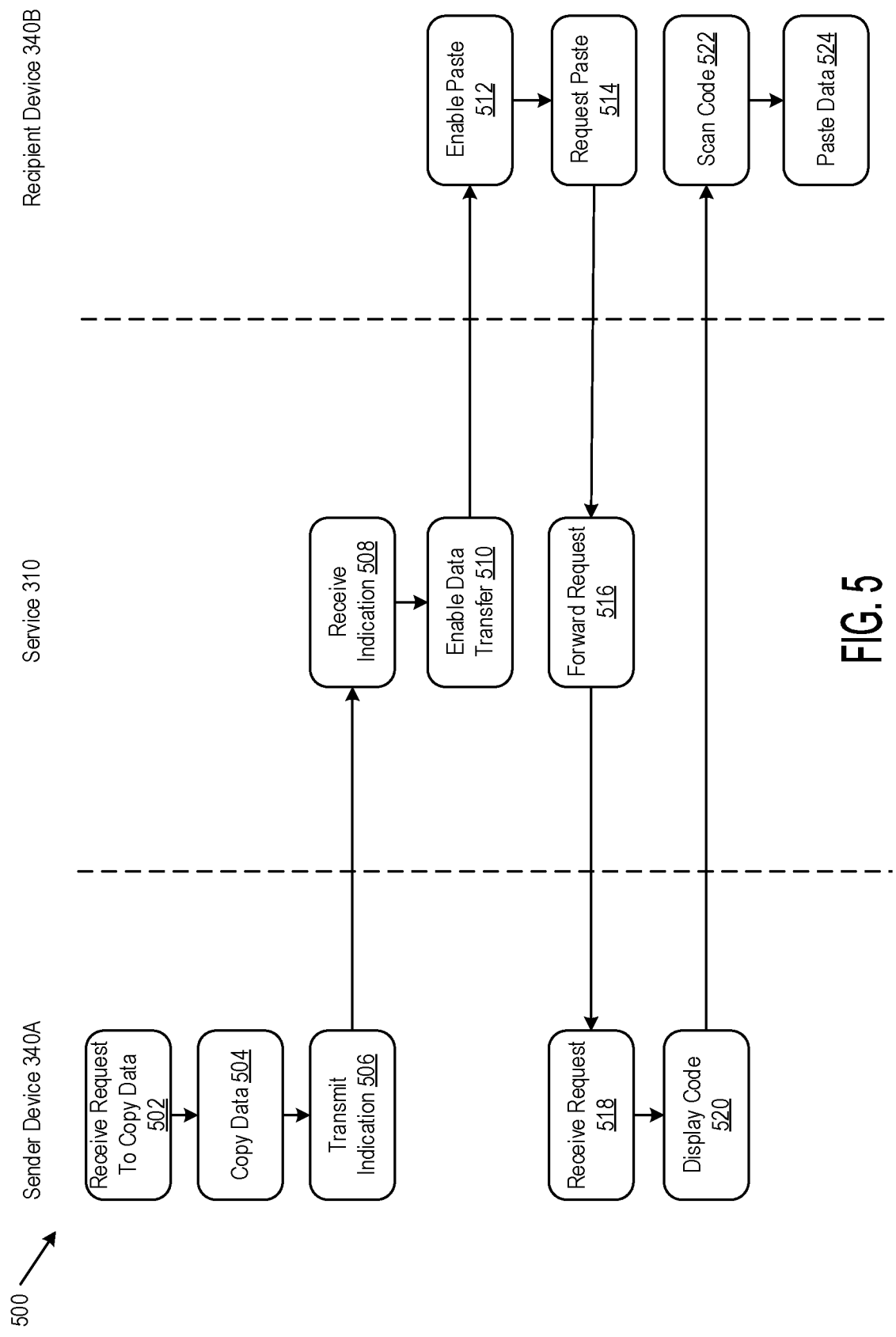
FIG. 5 is a flow diagram of a method for transferring data corresponding to scannable codes in accordance with an illustrative embodiment.

Referring now to FIG. 5, depicted is a flow diagram of a method 500 for transferring data corresponding to scannable codes in accordance with an illustrative embodiment. The operations and functionalities of the method 500 may be performed by the components described in FIG. 1 and FIG. 2, the system 300, the flow 400, and/or the flow 450 detailed above. In brief overview, a first device can receive a request to copy data (502). The first device can copy the data (504). The first device can transmit an indication that the first device copied the data (506). The service can receive the indication from the first device (508). The service can enable data transfer between the first device and a second device (510). The second device can enable pasting of data (512). The second device can request to paste the data (514). The service can forward the request to paste data (516). The first device can receive the request to paste the data (518). The first device can display a scannable code (520). The second device can scan the scannable code (522). The second device can paste the data from the first device (524).

In further detail, a first device (e.g., sender device 340A) can receive a request to copy data (502). The application (e.g., application 350A) running on the first device (e.g., sender device 340A) and the application (e.g., application 350B) running on the second device (e.g., recipient device 340B) may have established a separate connection with the service (e.g., service 310) over the network (e.g., network 170). For example, to access the resources hosted on the service, a user on the first device may have logged in via a prompt to enter authentication credentials displayed on the first device. Separately, a user on the second device may have logged in via a prompt to enter authentication credentials displayed on the second device. The user of the first device may be the same as the user of the second device. Once successfully authenticated, both the application running on the first device and the application running on the second device may access various resources on the service. Both the application may have event listeners to facilitate the copying of data from the first device onto the second device.

Subsequently, the first device can receive a command to copy data. The data may correspond to various forms of information, such as text, an image, audio content, video content, or file, among others accessible at the first device. In some embodiments, the first application can display a user interface via which to receive the command to copy the data. The first device can present, render, or otherwise display the user interface and the data to be copied via the display. The first device may detect the command to copy the data through the user interface of the first device. For example, the user of the first device may highlight a portion of text and images on a document to which to copy as the data.

In some embodiments, the first device may identify the command to copy from an interaction with an actionable item to command to copy the data. The displays can display, render, or present user interfaces or actionable items (e.g., button). The actionable item can correspond to or be associated with the copied data. For example, the actionable item can reference the copied data in a memory address of the first device. In some embodiments, the actionable item may be a menu or interface for the user to select data to copy among the data stored by the first device.

The first application can detect the user interacting with the actionable item. In some embodiments, responsive to the detection, the first application can identify the command to copy the data from the first device to the second device. For example, the first device can detect a touch selection or input keypress to select the actionable item. The first device can identify or extract the data selected by the user for copying.

The first device can copy the data (504). Upon receipt of the command, the first device may identify the data to be copied. The first device can receive the command via a user interface of the first device. The first device can copy the data into a clipboard. For example, the first device can include a copy & paste function to copy the data into the temporary storage.

The first device can transmit an indication (e.g., copy indication 362) that the first device copied the data (506). Upon copying of the data, the first device can transmit the copy indication responsive to the first device receiving the selection of the actionable items to display the scannable code. The copy indication may indicate that the first device copied the data into the copied data of the storage. The copy indication can be a message that includes information about the copied data. The copy indication can include identifiers of the first device that copied the data. The copy indication can include a timestamp of when the data was copied. In some embodiments, the copy indication can include identifiers of the second device for which the data was copied to be pasted. The first device can identify that the user of the first device copied data.

In some embodiments, the first device can transmit the copy indication responsive to the first device receiving the selection of the actionable items to display the scannable code. The first device can cause the display to display an actionable item to request generation of the scannable code. The first device can include the actionable item (e.g., button)

in a user interface of the first device. In some embodiments, the actionable item is a menu or interface for the user to select a type (e.g., QR code or barcode) or size (e.g., full screen or icon) of the scannable code to generate. The first device can detect the user interacting with the actionable item. In some embodiments, responsive to the detection, the first device can identify the request to generate the scannable code. For example, the application can detect a touch selection or input keypress to select the actionable item. Based on the selections, the first device can identify or extract the type or size of scannable code that was requested. Upon detection, the first device may provide the copy indication to the service.

The service can receive the indication from the first device (508). The service can retrieve, identify, or otherwise receive the indication from the first device. The service can handle, identify, or receive copying or transferring of data among the applications of the devices. In some embodiments, the service can identify that the first device copied data. The service can receive, from the first device, the indication that a user of the first device caused the first device to generate the copied data. The indication can cause the service to enable the second device to paste the data copied from the first device.

In some embodiments, the service can identify selections of actionable items via user interfaces presented on the applications of the devices to copy the data. For example, the service can identify that the user of the first device selected the actionable item to copy data. In some embodiments, the copy indication may correspond to the selection of the actionable item to display the scannable code on the first device. With the receipt from the first device, the service may store and maintain the copy indication. In some embodiments, the service transmits the indication responsive to the user interacting with the actionable item to display the scannable code. In some embodiments, the service may have received multiple copy indications from multiple devices.

The service can enable data transfer between the first device and the second device (510). Upon receipt of the copy indication, the service can send, provide, or otherwise transmit at least one paste enable indication to the second device. The paste enable indication may indicate to the recipient device that the second device is permitted to transfer the copied data from the first device. The paste enable indication may be a message include configuration information for enabling transfer of the data from the first device, such as an identifier for the first device. In some embodiments, the service can enable the first device to copy data. In some embodiments, the service can enable the second device to paste the data from the first device. In some embodiments, the service can identify a plurality of devices (including the second device) associated with the user to paste the data from the storage of the first device. With the identification, the service may send the paste enable indication to each device, such as the second device as depicted.

In some embodiments, in conjunction with the paste enable indication, the service can identify a list of devices from which the second device is permitted to paste the data. As discussed above, the service may store and identify the copy indications received from the multiple devices on the database. The identification of the list of devices may be based on the copy indications maintained on the database. With the identification, the service may generate the list from which to select at least one of the devices to transfer the copied data. In some embodiments, the list can be included or part of the enabling of paste enable indication. In some embodiments, the service may provide the list separately from the paste enable indication.

The second device can enable pasting of data (512). Upon receipt of the paste enable indication, the second device can enable pasting of the copied data. The pasting of the copied data may be via the display of the first device and camera of the second device, and not via the network through the service. In some embodiments, the second device can extract or identify the settings or the configurations from parsing the paste enable indication. To enable paste, the second device may include a user element in an interface for the second device to initiate copy and pasting of the data from the first device. For example, the second device may include a menu item labeled "paste using QR code" option in the second application.

In some embodiments, the second device can receive the list from which to select at least one of the device to transfer the data. The list may be received from the service, in conjunction with or separately from the paste enable indication. Upon receipt, the second device can display the list on the display. For example, when the "paste using QR code" option is activated, the second device may display the list. The user of the second device can use the displayed list to identify and select the first device.

The second device can request to paste the data (514). Subsequent to enabling paste, the second device can identify, detect, or receive a command to paste the copied data from the first device. In some embodiments, the second device may detect the command to paste through a user interaction with the second device. For example, the second device can detect a user interaction activating the "paste using QR code" option via the second device. In some embodiments, the second device may detect the command to paste through an event to activate the camera on the second device. For example, the user may open a program to acquire an image through the camera, and the second device may detect the opening of the program as the command to paste the copied data.

In some embodiments, the second device may identify the sender device 340A from which the data is to be transferred onto the second device. In some embodiments, the second device may identify the first device from the paste enable indication. In some embodiments, the second device may identify the first device from the selection of the device from the list. As discussed above, the list may be to select at least one of the devices to transfer the data. With the identification, the first device may include the identifier for the first device for the command.

Upon receipt of the command, the second device may generate a request to paste the copied data to transmit to the service. The request may include information to facilitate the transfer of the data from the first device to the second device. For example, the information of the request may include the identifier for the first device. The identifier for the first device may correspond to the selection from the list of devices presented at the second device. In some embodiments, the second device may include a time stamp corresponding to a time at which the command to paste occurred. With the generation, the second device can send, provide, or otherwise transmit the request to paste to the service. In some embodiments, the second device may omit the transmission of the request to paste, even when the command to paste is received at the second device.

The service can forward the request to paste data (516). In turn, the service can retrieve, identify, or otherwise receive the request to paste from the second device. Upon receipt, the service may identify the first device from which to transfer the copied data. The service can extract or identify the identifier for the first device from the data request. Upon the identification from the request to paste, the service may identify the first device.

In some embodiments, the service can identify the first device using the timestamp identified in the request to paste. In some embodiments, the service may use a time stamp corresponding to a time of request of the request. The service can compare the timestamp to the timestamp of receipt of the copy indications maintained on the service. Based on the comparison, the service can identify at least one of devices that indicated copying of data (e.g., copied data 360) prior to the receipt of the request to paste the copied data. For example, the service may identify the first device at which the data was most recently copied.

With the identification, the service can generate a code request to transmit to the first device. The code request may specify the first device to display of at least scannable code on the display. In some embodiments, the code request may correspond to the request to paste forwarded by the service to the first device. Upon generation, the service can send, provide, or otherwise transmit the code request to the first device. In some embodiments, the service may omit the transmission of the code request, when no request to paste is received.

The first device can receive the request to paste the data (518). The first device can retrieve, identify, or otherwise receive the code request from the service. The code request can specify that the first device is to initiate transferal of the data from first device to paste to the second device. In some embodiments, the first device can identify the interaction with the actionable item displayed on the first device as the receipt of the code request. As discussed above, the first device may display the actionable item to display a scannable code to initiate the transfer the copied data from the first device to the second device. In some embodiments, the first device may fetch, retrieve, or identify the copied data, upon receipt of the code request.

Upon receiving the code request, the first device can generate the scannable code corresponding to the copied data. In some embodiments, the first device may use the copied data from the first device to generate the scannable code. The first device may write, create, or generate the scannable code in accordance with a binary code, such as binary Bose-Chaudhuri-Hocquenghem (BCH) codes or binary Reed-Solomon codes, among others. In some embodiments, the first device may include metadata to the copied data in generating the scannable code. The metadata may include, for example, an account identifier for the user of the first device, an application name of the application executing on the first device, a device identifier for the sender device, and the time stamp identifying the time at which the data is copied, among others. When included, the scannable code can include or correspond to a representation of the copied data as well as the metadata. In some embodiments, the first device may generate a sequence of scannable codes for the copied data. Each scannable code in the sequence may correspond to a portion of the copied data.

The first device can display a scannable code (520). Upon generation, the first device may render, present, or otherwise display the scannable code. The display of the scannable code may be for acquisition or scanning by the camera on the second device. In some embodiments, the first device may present or display an actionable item in the user interface of the first device to display the scannable code corresponding to the copied data, as discussed above. Upon detecting user interaction with the actionable item on the user interface, the first device may display the scannable code. In some embodiments, the first device may display the scannable code for a set period of time (e.g., 30 seconds to 30 minutes), during which the camera of the second device is to scan the scannable code. In some embodiments, the first device may present the sequence of scannable codes corresponding to the copied data.

The second device can scan the scannable code (522). As the scannable code is displayed on the first device, the second device can perform a scan of the scannable code via the camera. In some embodiments, the second device may perform the scan of the sequence of scannable codes presented on the first device via the camera of the second device. By performing the scan, the second device may process the acquisition of the scannable code to reconstruct the copied data as pasted data. In some embodiments, the pasted data may include the copied data and the metadata included in the scannable code. In some embodiments, the second device may reconstruct the copied data as the pasted data in accordance with the binary code, such as binary Bose-Chaudhuri-Hocquenghem (BCH) codes or binary Reed-Solomon codes, among others.

The second device can paste the data from the first device (524). Upon completion of the scanning, the second device can store the pasted data onto the storage of the second device. In some embodiments, the second device may present or display the pasted data within the user interface of the application of the second device. For example, the copied data may include text and images from a web document accessed via the first device, as well as metadata. The second device upon reassembly from the scannable code may display the pasted data including the text, images, and metadata through the user interface on the second device.

In addition, the second device may transmit, send, or provide a notification to the service. The provision of the notification by the second device can be performed, when the pasted data is fully reconstructed from the scannable code. The notification can indicate that the scanning of the scannable code is completed at the second device. The notification may include the identifier for the first device or the identifier for the second device, or any combination thereof, among others.

Upon receipt of the notification, the service can identify or determine that the scan of the scannable code by the second device is complete. The service may parse the notification to identify the identifier for the first device or the identifier for the second device. With the determination, the service may generate an indication of completion to send to the first device. The indication of complete may be to terminate displaying of the scannable code by the first device via the display. Once generated, the service may send the indication to the first device. In response to receipt, the first device may cease or terminate displaying of the scannable code via the display.

In this manner, by facilitating transfer and reconstruction of the data via scannable codes acquired by the camera of the second device, the method 500 may resolve issues arising in approaches that solely rely on optical characters scanning (OCR) that leads to incomplete or inaccurate transfers of data. Furthermore, the method 500 can account for the repeated and excessive communications from network-based transfers of data. As such, the method 500 may provide for improved privacy and security as well as integrity of data transfers between multiple devices.

Various elements, which are described herein in the context of one or more embodiments, may be provided separately or in any suitable sub combination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

The systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM (compact disc read only memory), USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skills in the relevant art can affect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method of copying data corresponding to a scannable code, comprising:
    transmitting, by a first device responsive to identifying that a user of the first device copied data, an indication to a service that the first device copied the data, to cause the service to enable a second device to paste the data copied from the first device;
    receiving, by the first device, a request to copy the data from the first device to paste on the second device of the user; and
    displaying, by the first device responsive to the request, a scannable code corresponding to the copied data to be scanned by a camera of the second device to enable the user of the second device to paste the copied data.

2. The method of claim 1, wherein receiving the request further comprises receiving, from the service, an indication that the user of the second device requested copying of the data from the first device to the second device.

3. The method of claim 1, wherein receiving the request further comprises identifying, responsive to the user interacting with an actionable item on the first device, the request to copy the data from the first device to the second device.

4. The method of claim 1, further comprising displaying, by the first device responsive to identifying that the user of the first device copied the data, an actionable item to display the scannable code responsive to the user interacting with the actionable item.

5. The method of claim 1, wherein transmitting the indication further comprises transmitting the indication that the first device copied the data, responsive to the user interacting with an actionable item to display the scannable code.

6. The method of claim 1, further comprising generating, by the first device responsive to receiving the request from the service, the scannable code based at least on the data stored on a local buffer, the scannable code identifying the data and metadata associated with the copying of the data.

7. The method of claim 1, wherein receiving the request further comprises receiving the request, responsive to the service identifying the first device of a plurality of devices on which the user copied responsive data based at least on a time of the indication.

8. A system for copying data corresponding to a scannable code, comprising:
    a first device having one or more processors coupled with memory, configured to:
        transmit, responsive to identifying that a user of the first device, copied data, an indication to a service that the first device copied the data, to cause the service to enable a second device to paste the data copied from the first device;
        receive a request to copy the data from the first device to paste on the second device of the user; and
        display, responsive to the request, a scannable code corresponding to the copied data to be scanned by a camera of the second device to enable the user of the second device to paste the copied data.

9. The system of claim 8, wherein the first device is further configured to receive, from the service, an indication that the user of the second device requested copying of the data from the first device to the second device.

10. The system of claim 8, wherein the first device is further configured to identify, responsive to the user interacting with an actionable item on the first device, the request to copy the data from the first device to the second device.

11. The system of claim 8, wherein the first device is further configured to display, responsive to identifying that the user of the first device copied the data, an actionable item to display the scannable code responsive to the user interacting with the actionable item.

12. The system of claim 8, wherein the first device is further configured to transmit the indication that the first device copied the data, responsive to the user interacting with an actionable item to display the scannable code.

13. The system of claim 8, wherein the first device is further configured to generate, responsive to receiving the request from the service, the scannable code based at least on the data stored on a local buffer, the scannable code identifying the data and metadata associated with the copying of the data.

14. The system of claim 8, wherein the first device is further configured to receive the request, responsive to the service identifying the first device of a plurality of devices on which the user copied responsive data based at least on a time of the indication.

15. A non-transitory computer readable medium storing program instructions for causing at least one processor of a first device to:
  transmit, responsive to identifying that a user of the first device, copied data, an indication to a service that the first device copied the data, to cause the service to enable a second device to paste the data copied from the first device;
  receive a request to copy the data from the first device to paste on the second device of the user; and
  display, responsive to the request, a scannable code corresponding to the copied data to be scanned by a camera of the second device to enable the user of the second device to paste the copied data.

16. The non-transitory computer readable medium of claim 15, wherein the instructions cause the at least one processor to receive, from the service, an indication that the user of the second device requested copying of the data from the first device to the second device.

17. The non-transitory computer readable medium of claim 15, wherein the instructions cause the at least one processor to identify, responsive to the user interacting with an actionable item on the first device, the request to copy the data from the first device to the second device.

18. The non-transitory computer readable medium of claim 15, wherein the instructions cause the at least one processor to transmit the indication that the first device copied the data, responsive to the user interacting with an actionable item to display the scannable code.

19. The non-transitory computer readable medium of claim 15, wherein the instructions cause the at least one processor to generate, responsive to receiving the request from the service, the scannable code based at least on the data stored on a local buffer, the scannable code identifying the data and metadata associated with the copying of the data.

20. The non-transitory computer readable medium of claim 15, wherein the instructions cause the at least one processor to receive the request, responsive to the service identifying the first device of a plurality of devices on which the user copied responsive data based at least on a time of the indication.

\* \* \* \* \*